(12) United States Patent
Uemura et al.

(10) Patent No.: US 11,102,928 B2
(45) Date of Patent: Aug. 31, 2021

(54) ELECTRIC WORK VEHICLE AND MOWER UNIT

(71) Applicant: Kubota Corporation, Osaka (JP)

(72) Inventors: Katsuhiko Uemura, Sakai (JP); Hirokazu Ito, Sakai (JP); Kazuaki Matsuda, Sakai (JP); Yasuhiro Manji, Sakai (JP)

(73) Assignee: Kubota Corporation, Osaka (JP)

( * ) Notice: Subject to any disclaimer, the term of this patent is extended or adjusted under 35 U.S.C. 154(b) by 389 days.

(21) Appl. No.: 16/009,817

(22) Filed: Jun. 15, 2018

(65) Prior Publication Data

US 2019/0014718 A1 Jan. 17, 2019

(30) Foreign Application Priority Data

Jul. 13, 2017 (JP) .............................. JP2017-136939
Oct. 16, 2017 (JP) .............................. JP2017-200283

(51) Int. Cl.
| | | |
|---|---|---|
| *B60K 1/04* | (2019.01) | |
| *A01D 69/02* | (2006.01) | |
| *A01D 34/00* | (2006.01) | |
| *A01D 34/66* | (2006.01) | |
| *A01D 34/78* | (2006.01) | |

(Continued)

(52) U.S. Cl.
CPC ............ *A01D 69/02* (2013.01); *A01D 34/003* (2013.01); *A01D 34/66* (2013.01); *A01D 34/78* (2013.01); *B60K 1/04* (2013.01); *B60L 50/66* (2019.02); *B60L 53/80* (2019.02); *B62B 5/0003* (2013.01); *A01D 2101/00* (2013.01); *B60K 2001/0416* (2013.01); *B60K 2001/0477* (2013.01); *B60K 2001/0488* (2013.01); *B60K 2001/0494* (2013.01); *B60L 2200/40* (2013.01); *B60Y 2200/223* (2013.01); *B62B 1/14* (2013.01); *B62B 1/26* (2013.01); *B62B 2202/61* (2013.01)

(58) Field of Classification Search
CPC . B60K 1/04; B60L 50/66; B60L 53/80; B62B 5/0003; A01D 69/02; A01D 34/003; A01D 34/66; A01D 34/78
See application file for complete search history.

(56) References Cited

U.S. PATENT DOCUMENTS 5,301,765 A * 4/1994 Swanson .................. B60L 8/00
 180/68.5
5,360,307 A * 11/1994 Schemm ................. B60L 53/80
 414/343

(Continued)

FOREIGN PATENT DOCUMENTS

| JP | 51142509 U | 11/1976 |
|---|---|---|
| JP | 60155184 U | 10/1985 |

(Continued)

*Primary Examiner* — John D Walters
(74) *Attorney, Agent, or Firm* — The Webb Law Firm

(57) ABSTRACT

An electric work vehicle includes: a battery accommodating portion that is provided in the vehicle body and accommodates a battery; a first connector provided on the battery accommodating portion; a second connector provided on the battery; and an operating tool for moving the battery and the second connector, and switching from a pre-attachment orientation in which the second connector opposes the first connector to an attachment orientation in which the second connector is joined to the first connector.

6 Claims, 14 Drawing Sheets

(51) Int. Cl.
  *B60L 53/80* (2019.01)
  *B60L 50/60* (2019.01)
  *B62B 5/00* (2006.01)
  *A01D 101/00* (2006.01)
  *B62B 1/26* (2006.01)
  *B62B 1/14* (2006.01)

(56) References Cited

U.S. PATENT DOCUMENTS

| | | | |
|---|---|---|---|
| 6,101,794 A | 8/2000 | Christopherson et al. | |
| 6,357,070 B1* | 3/2002 | Venard | H01M 50/20 15/50.1 |
| 8,653,786 B2* | 2/2014 | Baetica | A01D 34/78 320/104 |
| 10,183,563 B2* | 1/2019 | Rayner | H02J 7/0042 |
| 2009/0101422 A1* | 4/2009 | Subramanian | B62D 25/082 180/65.31 |
| 2012/0326107 A1* | 12/2012 | Ojima | B60K 1/04 254/89 R |
| 2013/0025950 A1* | 1/2013 | Brandon | B60L 50/52 180/65.1 |

FOREIGN PATENT DOCUMENTS

| | | |
|---|---|---|
| JP | 63114126 U | 7/1988 |
| JP | 2216320 A | 8/1990 |
| JP | 200595044 A | 4/2005 |
| JP | 2005289181 A | 10/2005 |
| JP | 20061961 A | 1/2006 |
| JP | 2010161972 A | 7/2010 |
| JP | 2013115 A | 1/2013 |
| JP | 5910699 B2 | 4/2016 |
| JP | 2017104142 A | 6/2017 |

* cited by examiner

ELECTRIC WORK VEHICLE AND MOWER UNIT

CROSS-REFERENCE TO RELATED APPLICATIONS

This application claims priority to Japanese Patent Application Nos. 2017-136939 and 2017-200283, filed Jul. 13, 2017, and Oct. 16, 2017, respectively, the disclosures of which are hereby incorporated in their entirety by reference.

BACKGROUND OF THE INVENTION

Field of the Invention

The present invention relates to an electric work vehicle and a mower unit.

Description of Related Art (1) First Related Art

An electric work machine disclosed in JP 2013-000115 A includes a work unit motor for driving a work unit, a travel motor for rotating travel wheels, and a battery for supplying electrical power to the work unit motor and the travel motor. A vehicle body-side connecting portion for connecting the battery is provided in a rear portion of the vehicle body, and a battery-side connecting portion that is to be connected to the vehicle body-side connecting portion is provided on the battery. Wheels are attached to the battery so that the battery can be readily moved when being mounted in the rear portion of the vehicle body. The battery moved into the vehicle body needs to be connected to a control unit. Although JP 2013-000115 A does not disclose the connection method, usually, the battery is connected via an electrical cable. At this time, in the case of simplifying connection between a connector of the electrical cable and a connector of the battery, if one of the connectors or both of them are made more flexible, there is a concern that the connectors will interfere with other members if, for example, the connected connectors swing. Conversely, if both connectors are made less flexible, the connection between the connections needs to be complete at the same time of connecting the battery-side connecting portion of the battery to the vehicle body-side connecting portion, and an expensive precise guiding mechanism is required.

In view of the foregoing situation, there is a demand for an electric work vehicle in which it is possible to readily and reliably connect the connectors to each other and fix the battery to the vehicle body, regardless of low flexibility of the vehicle body-side connector and the battery-side connector.

(2) Second Related Art

A mower unit disclosed in JP 2010-161972 A includes a blade ("mowing blade" in this document) capable of mowing grass on the ground surface by being driven to rotate around a rotation axis, and a housing ("mowing blade housing" in this document) that covers the blade and whose lower face is open.

In a mower unit, foreign matter, such as mown grass that contains mud and moisture, is likely to be accumulated in an internal space of the housing that covers the blade, during a mowing operation.

To clean the internal space of the housing, there are cases where, for the above-described conventional technique, a method is employed in which a mower unit is removed from a vehicle body, then a mower deck is inverted, and foreign matter that is present in the internal space of the housing is manually removed using a scraper or the like, for example. However, this method takes a lot of time and effort.

On the other hand, as a method different from the above one, there are cases where, for example, a method is employed in which a splash of water is generated by pouring water into the internal space of the housing through an opening provided in the mower deck and driving the blade to rotate it, and foreign matter in the internal space of the housing is removed with this water splash. However, foreign matter cannot be appropriately removed with this method if the foreign matter sticks to the inner face of the housing, for example.

In view of the foregoing situation, there is a demand for a mower unit with which the internal space of the housing can be favorably cleaned.

SUMMARY OF THE INVENTION (1) The following electric work vehicle is proposed in correspondence to the first related art:

An electric work vehicle comprising:

a vehicle body;

a battery accommodating portion that is provided in the vehicle body and accommodates a battery;

a first connector provided on the battery accommodating portion;

a second connector provided on the battery; and an operating tool for moving the battery and the second connector, and switching from a pre-attachment orientation in which the second connector opposes the first connector to an attachment orientation in which the second connector is joined to the first connector.

In this configuration, a power supply coupler for connection to supply power from the battery to the vehicle body is constituted by the first connector on the vehicle body side and the second connector on the battery side. The connection to supply power from the battery to the vehicle body is established as a result of the first connector and the second connector being joined to each other. At the first stage of this power-supply connection, the battery is moved to assume the pre-attachment orientation in which the first connector and the second connector oppose each other. At this time, the first connector and the second connect need only oppose each other, and thus, some degree of error is allowed when aligning the first connector and the second connector. That is to say, after the second connector and the battery have been moved to assume the pre-attachment orientation in which high accuracy is not strictly required, at the next stage, the battery and the second connector is moved to assume the attachment orientation from the pre-attachment orientation, and the first connector and the second connector are joined to each other, through an operation using the operating tool. Since the distance to be moved between the pre-attachment orientation and the attachment orientation is short, even a simple operating tool can make it easy to accurately switch the first connector and the second connector from the pre-attachment orientation to the attachment orientation. In addition, in the case of using a housing of the first connector or a housing of the second connector as a nesting-type guiding mechanism, the position accuracy required for the operating tool can be reduced.

In one preferred embodiment:
the operating tool includes:
a bracket fixed to the vehicle body;
an operating lever that is pivotal between a first pivot position and a second pivot position around a first lateral axis extending through the bracket; and
a connecting body connected to the operating lever and pivotal around a second lateral axis extending through the operating lever, a locking portion being formed at a free end of the connecting body, and the locking portion being configured to be locked at a locked portion that is formed on the battery when the operating tool assumes the pre-attachment orientation, and
in response to pivotal movement of the operating lever from the first pivot position to the second pivot position in a locked state where the locking portion is locked at the locked portion, the second lateral axis moves toward the first connector, and the first connector and the second connector are joined to each other.

A procedure of switching from the pre-attachment orientation to the attachment orientation is as follows. First, the battery is brought into the battery accommodating portion, and is moved until the positional relationship between the first connector and the second connector is the pre-attachment orientation. Thus, the locking portion of the connecting body can be locked at the locked portion of the battery by pivoting the connecting body. By locking the locking portion at the locked portion, the battery and the bracket enter a connected state through the connecting body. The relationship regarding the attachment of the connecting body to the operating lever is set so that, if the operating lever is pivoted from the first pivot position to the second pivot position when the battery and the bracket are in the connected state, the second lateral axis is displaced in the attaching direction. Accordingly, by pivoting the operating lever from the first pivot position to the second pivot position, the distance between the first connector and the second connector decreases, and ultimately, the positional relationship between the first connector and the second connector becomes the attachment orientation. That is to say, in the pre-attachment orientation, the battery and the bracket are connected to each other using the connecting body, the operating lever is then pivoted in this connected state, and thus, the first connector and the second connector are joined to each other.

According to one preferred embodiment:
the first connector is configured to be moved relative to the vehicle body, and
the first connector is connected to the operating lever such that the first connector moves toward the second connector in response to the pivotal movement of the operating lever from the first pivot position to the second pivot position.

By pivoting the operating lever from the first pivot position to the second pivot position when the connecting body is in the connected state, the distance between the first connector and the second connector decreases. Accordingly, if the first connector can be moved relative to the vehicle body, the first connector and the second connector are brought close to each other by pivoting the operating lever. Thus, the joint between the first connector and the second connector, i.e. switching to the attachment orientation is performed more smoothly.

According to one preferred embodiment:
in the locked state, the connecting body functions as a holding mechanism for holding the operating lever at the second pivot position.

This is realized by, for example, setting the positional relationship between the first lateral axis and the second lateral axis so that a pivoting force that acts against the pivoting of the operating lever from the second pivot position to the first pivot position is generated by an elastic force of the connecting body.

According to one preferred embodiment:
the connecting body has two vertical pieces and a lateral piece located between the vertical pieces,
the locking portion is formed at each of opposite ends of the lateral piece, and
the locked portion is located on each of opposite sides of the second connector to be locked with the locking portion associated therewith.

In this configuration, the locking portion is formed at each of opposite ends of the connecting body, and accordingly, the connecting body and the battery are more firmly locked with each other. In addition, the rigidity of the connecting body is increased by forming the connecting body to have a C shape. Furthermore, as a result of the second connector being arranged between two locked portions at which the two locking portions are locked, a force is smoothly transmitted while the battery (and ultimately the second connector) is moving to assume the attachment orientation from the pre-attachment orientation with the two locked portions serving as points of action, and the connecting body is restrained from twisting.

According to one preferred embodiment: the electric work vehicle further comprises:
a stopper for inhibiting movement of the battery beyond the attachment orientation, wherein the battery is fixed to the battery accommodating portion by the stopper inhibiting the movement, and the operating tool biasing the battery toward the attachment orientation from the pre-attachment orientation.

In this configuration, when the first connector is moved together with the battery in the attaching direction to assume the attachment orientation by the operating tool, the battery is inhibited from moving beyond the attachment orientation by the stopper. At this time, the battery is locked in a state of abutting against the stopper, by keeping the operating tool in the attachment orientation. That is to say, in this configuration, the operating tool also functions as a lock mechanism for locking the battery in cooperation with the stopper.

According to one preferred embodiment: the electric work vehicle further comprises:
a carrier for accommodating the battery; and
a guiding mechanism for guiding the carrier toward the battery accommodating portion from outside of the vehicle body, the guiding mechanism including guide rails attached to both side faces of the battery accommodating portion, and guide rollers attached to opposite side faces of the carrier and guided by the guide rails.

In this configuration, the battery is protected by the carrier, and accordingly, the battery is less likely to be damaged during attaching and detaching operations. In addition, the guiding mechanism makes it easy to move the carrier until the first connector and the second connector assume the pre-attachment orientation.

(2) The following mower unit is proposed in correspondence to the second related art:

A mower unit comprising:
a blade that rotates around a rotation axis to mow grass on a ground surface;
a housing that covers the blade, a lower face of the housing being open; and a cleaning mechanism that rotates around the rotation axis to remove foreign matter that is present in an internal space of the housing.

With this configuration, foreign matter, such as mown grass that contains mud and water, in the internal space of the housing can be scraped and appropriately removed by driving the cleaning mechanism to rotate it around the rotation axis. For this reason, for example, maintenance takes less time and effort than in the case of manually cleaning the internal space of the housing. In addition, for example, even foreign matter that sticks to an inner face of the housing can be removed without problems, unlike the case of cleaning the internal space of the housing with a water splash. Accordingly, the internal space of the housing can be cleaned preferably.

According to one preferred embodiment:

the cleaning mechanism is configured to be switched between a withdrawal state in which the cleaning mechanism is not located on a rotation trajectory of the blade, and a use state in which the cleaning mechanism is located on the rotation trajectory of the blade and rotates together with the blade.

With the above configuration, the internal space of the housing can be cleaned by the cleaning mechanism by means of a rotational force of the blade. During a usual mowing operation, the cleaning mechanism does not inhibit the blade from mowing grass, by setting the cleaning mechanism in the withdrawal state. During cleaning, the cleaning mechanism is set in the use state, and thus, the cleaning mechanism rotates together with the blade as a result of driving the blade, and scrapes foreign matter in the internal space of the housing. Thus, a dedicated motive power source for driving the cleaning mechanism is not needed, and the structure can be simplified.

According to one preferred embodiment:

the cleaning mechanism includes a sliding portion configured to slide in a radial direction relative to the rotation axis, and the cleaning mechanism is configured to be switched between the withdrawal state and the use state by sliding the sliding portion.

With the above configuration, the cleaning mechanism can be switched between the withdrawal state and the use state using the sliding portion, without providing a complex structure to the cleaning mechanism, and the structure can be simplified.

According to one preferred embodiment:

the housing includes a protruding portion that protrudes outward in the radial direction relative to the rotation axis, and the protruding portion allows a part of the cleaning mechanism to enter the protruding portion to cause the cleaning mechanism to be switched to the withdrawal state.

With the above configuration, the cleaning mechanism can be set in the withdrawal state by bringing a part of the cleaning mechanism into the protruding portion, which is a part of the housing. Thus, the cleaning mechanism can be switched between the withdrawal state and the use state while saving space, without making the structure more complex.

According to one preferred embodiment:

the cleaning mechanism includes an exposed portion that is exposed outward of the housing when the cleaning mechanism is in the use state.

With the above configuration, the exposed portion can be visually checked from the outside of the housing, and accordingly, the position of the cleaning mechanism in the use state can be readily checked. It is thus possible, for example, to save time and effort of finding the position of the cleaning mechanism after the cleaning by the cleaning mechanism in the use state has been completed, and the cleaning mechanism can be readily restored to the withdrawal state from the use state.

According to one preferred embodiment: the mower unit further comprises:

a lock portion that is configured to lock the cleaning mechanism in the withdrawal state.

With the above configuration, the cleaning mechanism can be prevented from switching to the use state by mistake, by locking the cleaning mechanism in the withdrawal state using the lock portion.

According to one preferred embodiment: the mower unit further comprises:

a detection sensor that is configured to detect the withdrawal state or the use state of the cleaning mechanism.

With the above configuration, it is possible to set driving conditions for the blade and give various notifications to the operator, based on the state of the cleaning mechanism detected by the detection sensor.

According to one preferred embodiment: the mower unit further comprises:

an electric motor that is configured to drive the blade, wherein, when the use state of the cleaning mechanism is detected by the detection sensor, the electric motor is controlled to reduce a driving speed thereof compared with when the withdrawal state is detected by the detection sensor.

With the above configuration, the motive power source of the blade is an electric motor, and accordingly, the rotational speed of the blade can be changed flexibly. The cleaning mechanism is in the withdrawal state during a usual mowing operation, and thus, the electric motor is controlled so that the blade rotates at a normal rotational speed. On the other hand, the cleaning mechanism is in the use state during cleaning, and accordingly, the rotational speed of the blade is made lower than the normal rotational speed. Thus, the blade and the cleaning mechanism can be prevented from being damaged.

(3) Further features and advantages achieved thereby will be apparent from the following descriptions.

BRIEF DESCRIPTION OF THE DRAWINGS

FIGS. 1 to 13 illustrate a first embodiment, in which:

FIG. 1 is an overall side view of an electric mowing machine, which is an example of an electric work vehicle;

FIG. 2 is an overall plan view of the electric mowing machine;

FIG. 3 is a perspective view of a battery accommodating portion and thereround;

FIG. 4 is an overall perspective view of a battery and a carrier, and illustrates a state of attaching the battery to the carrier;

FIG. 5 is an overall perspective view of the battery and the carrier in a state where the battery has been attached to the carrier;

FIG. 6 is a side view illustrating a process of attaching the carrier that accommodates the battery to the battery accommodating portion in the vehicle body;

FIG. 7 is a side view illustrating the process of attaching the carrier that accommodates the battery to the battery accommodating portion in the vehicle body;

FIG. 8 is a side view illustrating the process of attaching the carrier that accommodates the battery to the battery accommodating portion in the vehicle body;

FIG. 9 is a side view of the battery and an operating tool in a pre-attachment orientation in which a first connector and a second connector oppose each other;

FIG. 10 is a side view of the battery and the operating tool in an attachment orientation in which the first connector and the second connector are joined to each other;

FIG. 11 is a side view of the operating tool in which a locking portion of a connecting body is located near a locked portion, and an operating lever is located at a first pivot position;

FIG. 12 is a side view showing the operating tool in which the locking portion of the connecting body is locked at the locked portion, and the operating lever is located between the first pivot position and a second pivot position; and FIG. 13 is a side view showing the operating tool in which the locking portion of the connecting body is locked at the locked portion, and the operating lever is located at the second pivot position; and FIGS. 14 to 19 illustrate a second embodiment, in which:

FIG. 14 is a side view of a boarding-type mowing machine;

FIG. 15 is a plan view of the boarding-type mowing machine;

FIG. 16 is a view in partial section showing a mower unit as seen from above;

FIG. 17 is a view in vertical section of the mower unit, showing a withdrawal state of a cleaning mechanism;

FIG. 18 is a view in vertical section of the mower unit, showing a use state of the cleaning mechanism;

FIG. 19 is an exploded perspective view of the cleaning mechanism;

FIGS. 20 and 21 illustrates a third embodiment, in which:

FIG. 20 is a view in vertical section of a mower unit, showing a withdrawal state of the cleaning mechanism; and FIG. 21 is a view in vertical section of a mower unit, showing a use state of the cleaning mechanism.

DESCRIPTION OF THE INVENTION

First Embodiment

The first embodiment will be described below with reference to FIGS. 1 to 13.

In the following description, "front" means the front side relative to the vehicle body front-rear direction (traveling direction), and "rear" means the rear side relative to the vehicle body front-rear direction (traveling direction), unless explicitly stated otherwise. Further, "right-left direction" or "lateral direction" means the vehicle lateral direction (vehicle body width direction) that is perpendicular to the vehicle body front-rear direction. Still further, "above/upper" or "below/lower" refers to a positional relationship in the perpendicular direction (the vertical direction) of the vehicle body, and indicates a relationship at a height from the ground.

Figure 1:
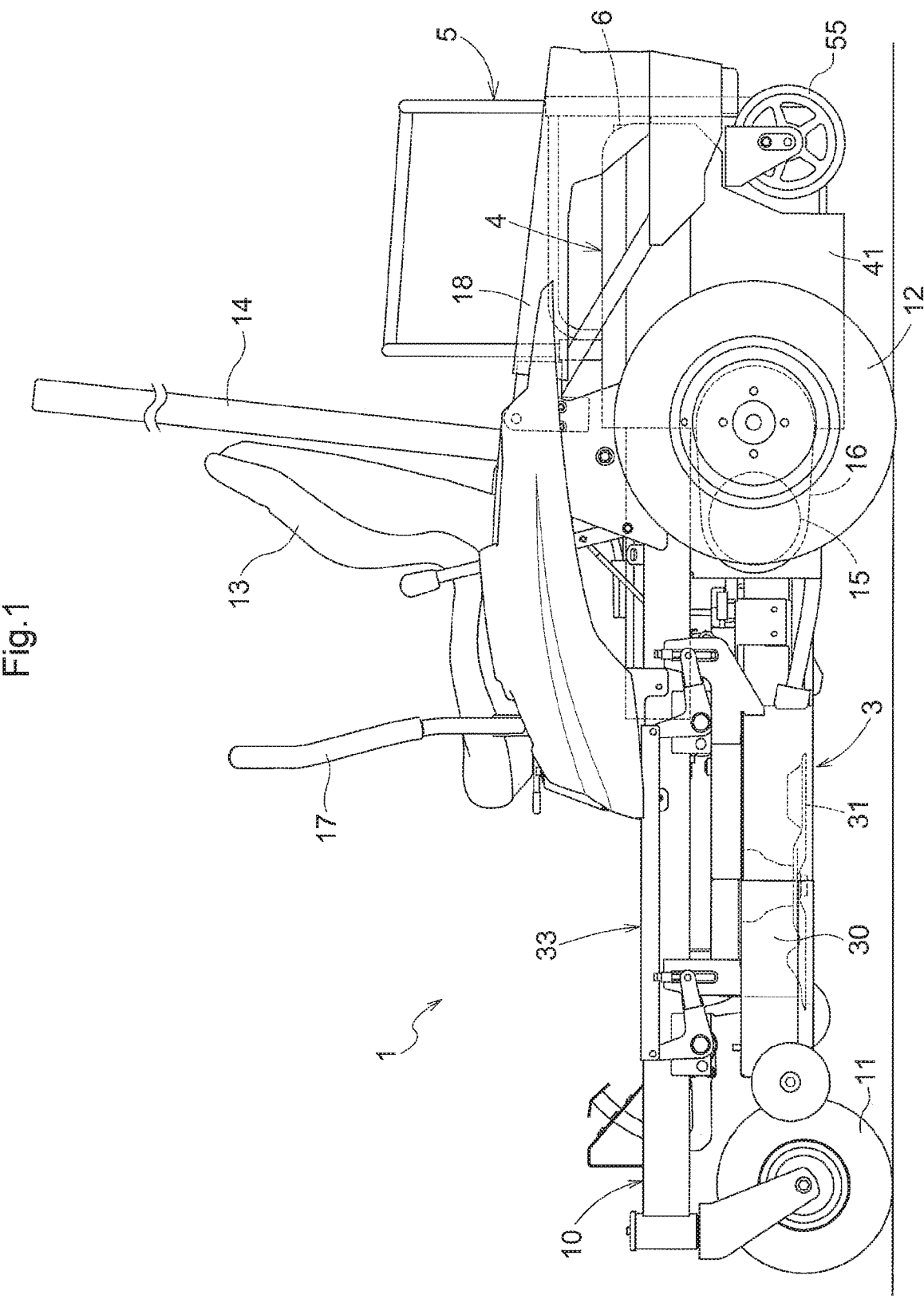
Figure 2:
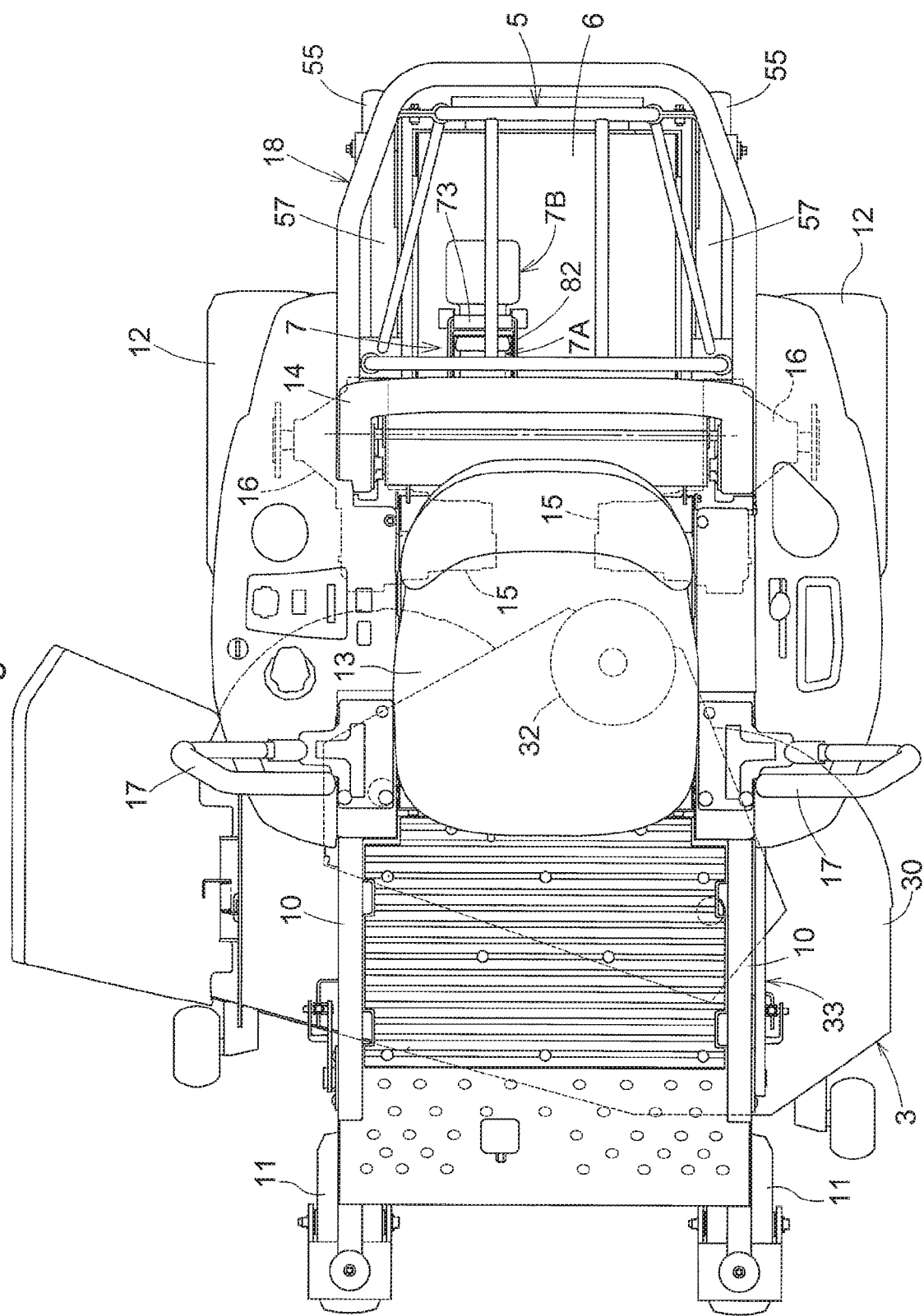

In the illustrated embodiment, an electric mowing machine is an example of an electric work vehicle. As shown in FIGS. 1 and 2, the electric mowing machine includes: right and left front wheels 11 that are supported in a front portion of a vehicle body 1; right and left rear wheels 12 that are supported in a rear portion of the vehicle body 1; a mower unit 3 that is supported in a lower portion of the vehicle body 1, between the front wheels 11 and the rear wheels 12; a battery accommodating portion 4 that is supported in a rear portion of the vehicle body 1, between the right and left rear wheels 12; an operator seat 13 that is supported in an upper portion of the vehicle body 1; a ROPS frame 14, etc.

The vehicle body 1 includes a frame 10 constituted by right and left longitudinal beams that extend in the front-rear direction, and a cross beam that connects the longitudinal beams. The operator seat 13 is supported by the frame 10, and a lower portion of the ROPS (rollover protection structure) frame 14 is connected to the frame.

The front wheels 11 are caster wheels, and the rear wheels 12 are driving wheels. Right and left travel motors 15 and deceleration mechanisms 16 are arranged in a rear portion of the frame 10. Motive power of the travel motors 15 is transmitted to the rear wheels 12 via the deceleration mechanisms 16. The right and left rear wheels 12 are driven independently.

Gear shift levers 17 are arranged on respective sides of the operator seat 13. If the right gear shift lever 17 is operated to a neutral position, the right travel motor 15 enters a stopped state. If the right gear shift lever 17 is operated to the forward side, the right travel motor 15 rotates to the forward side. If the right gear shift lever 17 is operated to the reverse side, the right travel motor 15 rotates to the reverse side. Similarly, if the left gear shift lever 17 is operated to the neutral position, forward side, or reverse side, the left travel motor 15 operates in the same manner as described above. The vehicle body 1 can travel forward or reverse and turn right or left by operating the right/left gear shift levers 17 to drive the right/left rear wheels 12 to the forward side or the reverse side independently of each other.

The mower unit 3 includes a mower deck 30, and a mowing blade 31 that is rotatably supported around a vertical axis within the mower unit 30. The mowing blade 31 is driven to rotate by a mowing blade motor 32. The mower deck 30 is suspended from the frame 10 so as to be able to be raised and lowered by a link mechanism 33.

A battery 6 for supplying power to the travel motors 15 and a mowing blade motor 32 is accommodated in a battery accommodating portion 4, which is formed in the rear portion of the vehicle body 1 between the right and left rear wheels 12. In this embodiment, the battery 6 is surrounded by a carrier 5, which has a handtruck/handcart configuration, and is moved together with the carrier 5. Accordingly, the battery accommodating portion 4 substantially functions as a carrier accommodating portion. The upper side of the battery accommodating portion 4 is covered by a rear cover 18, which pivots around a lateral axis.

Figure 3:
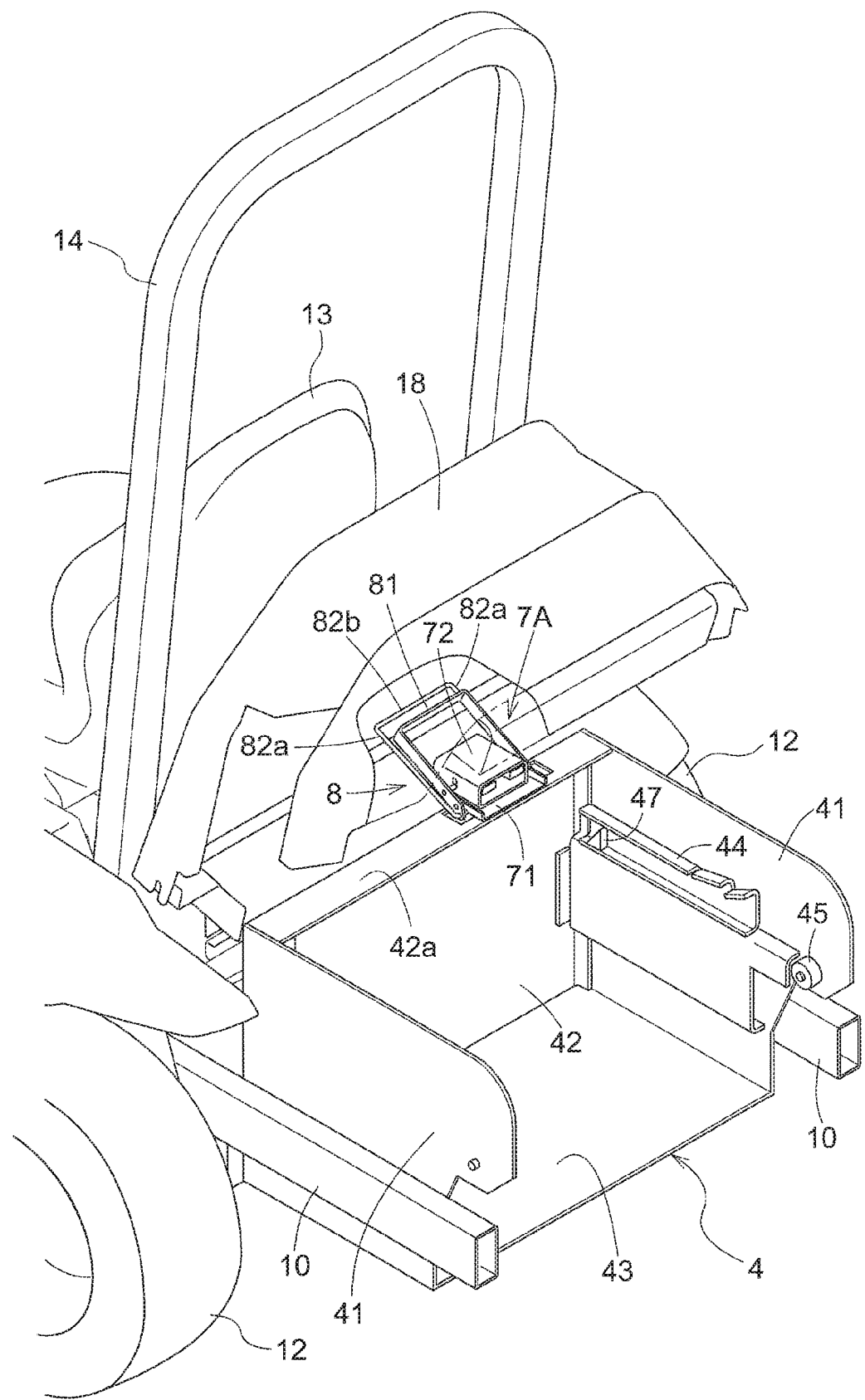

As shown in FIG. 3, in the battery accommodating portion 4, right and left side walls 41 are fixed to the rear portion of the frame 10; front ends of the right and left side walls 41 are connected to a front wall 42; and lower ends of the right and left side walls 41 and a lower end of the front wall 42 are connected to a horizontal floor plate 43.

Right and left guide rails 44 extending in the front-rear direction are fixed to the right and left side walls 41, such that the guide rails 44 serve as a guiding mechanism for guiding the carrier 5, that contains the battery 6, from the outside toward the battery accommodating portion 4. The guide rails 44 have a shape with a channel-shaped cross section. Right and left assist rollers 45 are rotatably provided slightly rearward of rear ends of the guide rails 44. Stoppers 47, made of an elastic body such as a spring or rubber, are provided within the channels of the right/left guide rails 44 adjacent front ends of the guide rails 44.

A horizontal face 42a is formed at an upper end of the front wall 42 of the battery accommodating portion 4 that is fixed to the frame 10. A first connector unit 7A is arranged on the horizontal face 42a, so that the first connector unit 7A provides a vehicle body-side connector of a power supply coupler 7 that is disposed on a power supply line for supplying electrical power from the battery 6 to the vehicle body. The first connector unit 7A includes a bracket 71 that is fixed to the horizontal face 42a, and a first connector 72 that is supported by the bracket 71 so as to be able to slide in the front-rear direction. An operating tool 8 is attached to the bracket 71 for attaching and detaching connectors of the power supply coupler 7, and details thereof will be described later.

Figure 4:
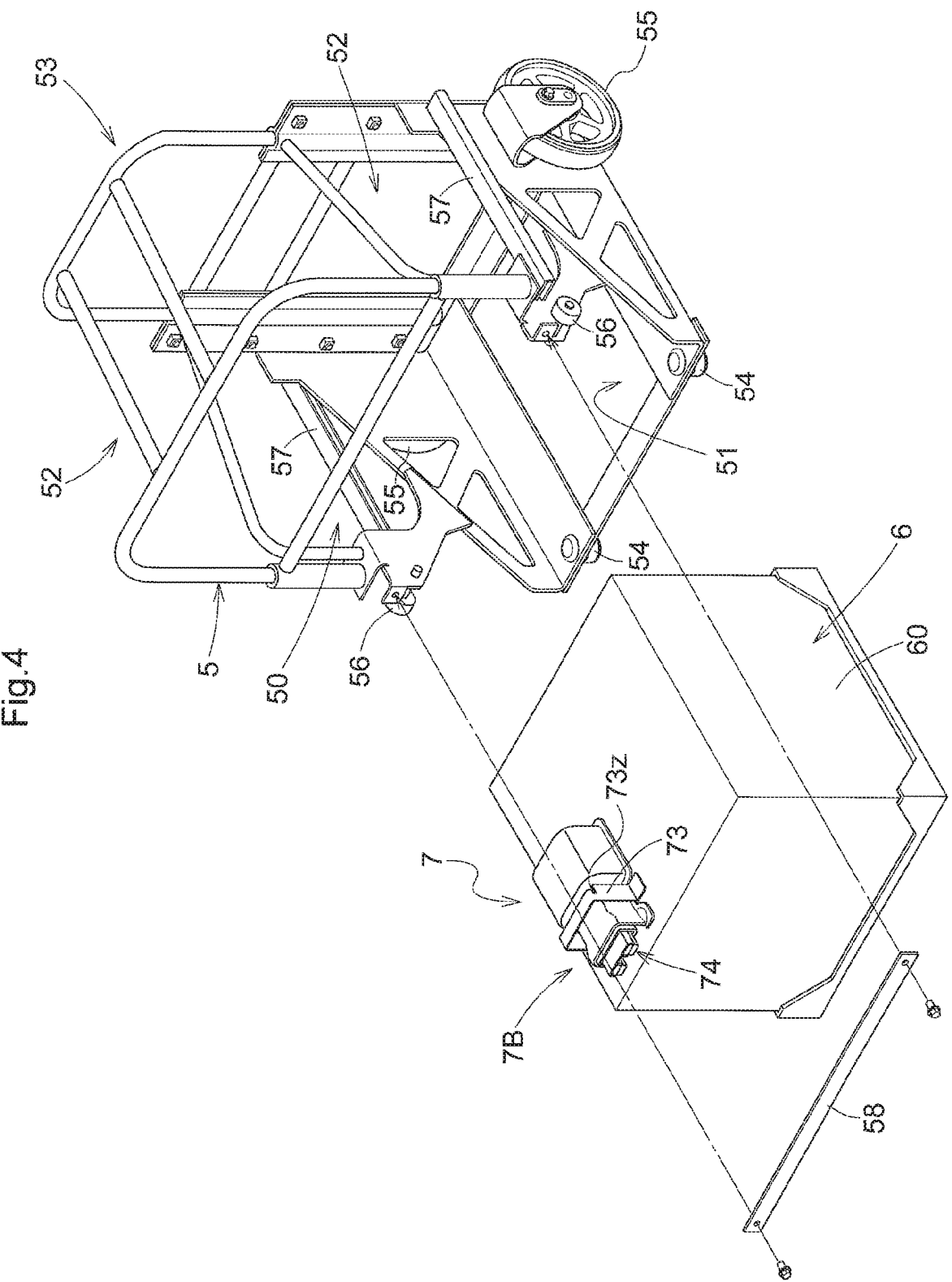
Figure 5:
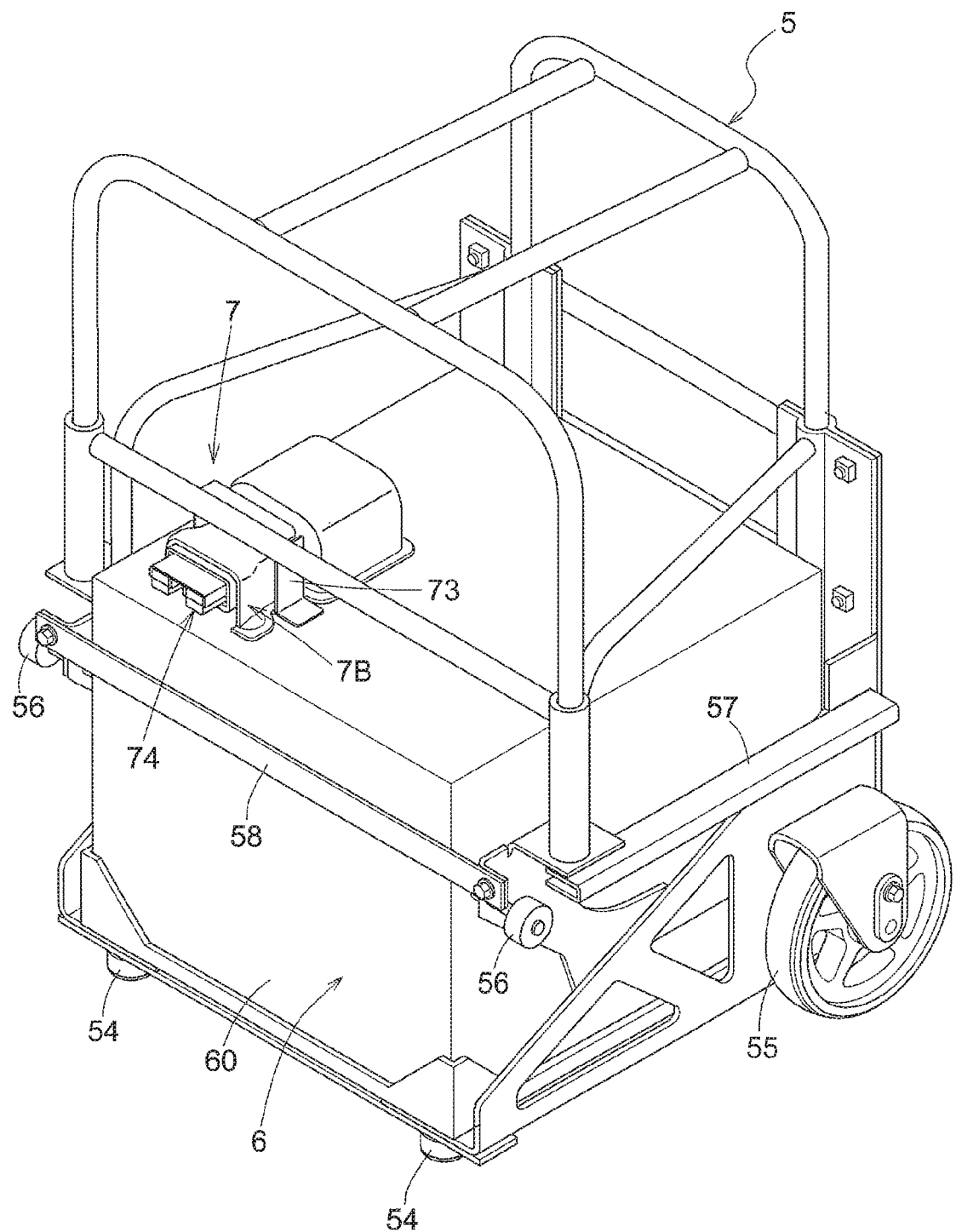

With reference to FIGS. 4 and 5, the carrier 5 will be described next. The carrier 5 creates, with pipes and plate materials, a space that is defined by a front face 50, a lower face 51, right and left side faces 52, and a rear face 53. The battery 6 is accommodated in this space. Shoes 54 are attached, facing downward, to right and left front portions of the lower face 51. Right and left large-diameter wheels 55 for movement are rotatably provided, via brackets, to rear portions of the side faces 52. The carrier 5 can stand alone by the shoes 54 and the large-diameter wheels 55, and the carrier 5 can be smoothly moved using the large-diameter wheels 55 by lifting up the shoes 54. Right and left guide rollers 56 are rotatably attached to front portions of the side faces 52. Furthermore, right and left guide rods 57 that extend in the front-rear direction from the rear side of the guide rollers 56 are provided on the right and left side faces 52.

As apparent from FIG. 4, the front face 50 of the carrier 5 is used as a gate for conveying the battery 6 into and out of the carrier 5 therethrough. As shown in FIG. 5, a plate-shaped fixing tool 58 is prepared to fix the battery 6 that has been conveyed into the carrier 5. The gate is blocked by attaching the fixing tool 58 to the front face 50 of the carrier 5, and thus, the battery 6 is fixed within the carrier 5.

The battery 6 is in a mode where many lithium-ion battery cells are contained in a rectangular parallelepiped case 60. A second connector unit 7B is provided on an upper front portion of the battery 6, so that the second connector unit 7B provides a battery-side connector of the power supply coupler 7. The second connector unit 7B includes a fixing bracket 73 that is attached to the case 60, and a second connector 74 that is fixed to the case 60 through the fixation bracket 73. Coupling of the power supply coupler 7 is realized by attaching the second connector 74 to the first connector 72, whereby electrical power is supplied from the battery 6 to the vehicle body.

Figure 6:
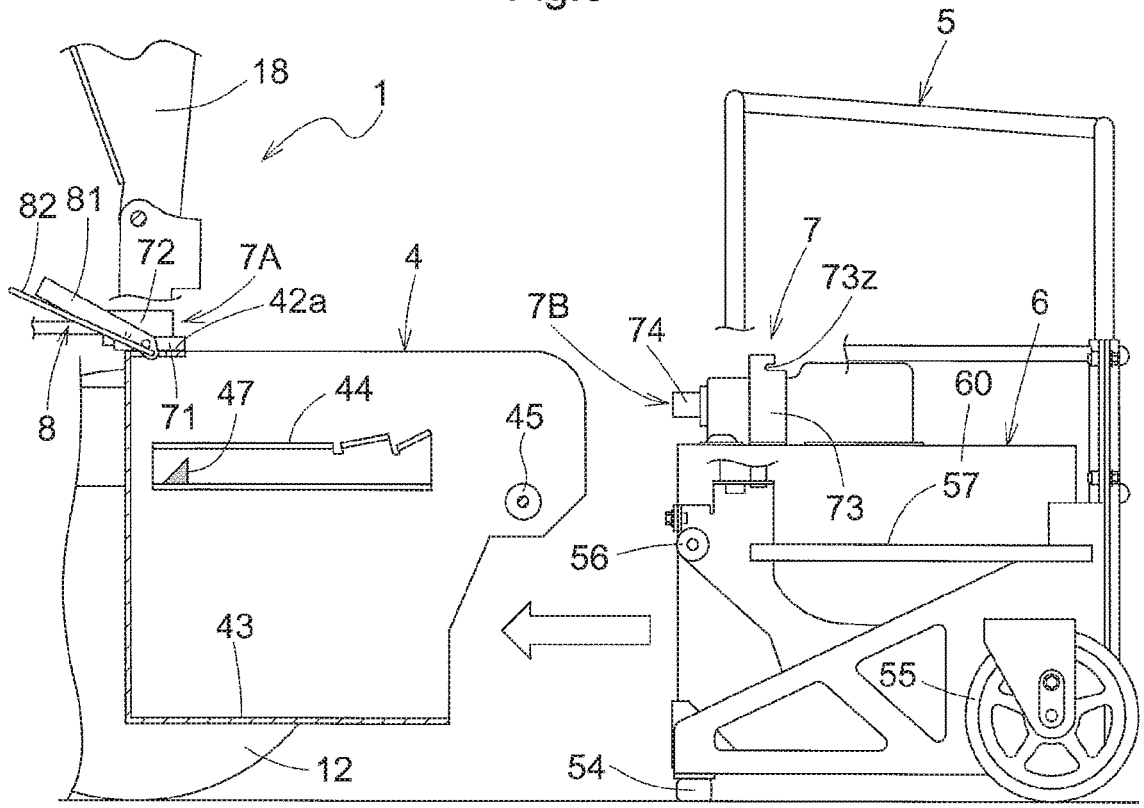
Figure 7:
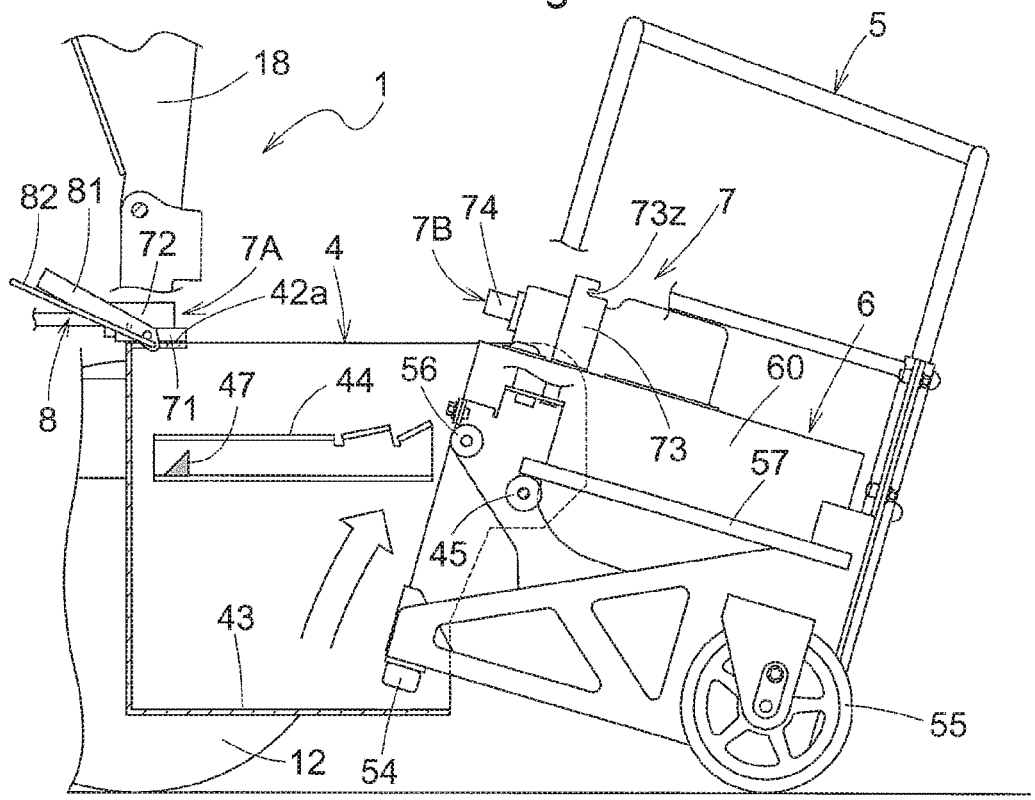

FIGS. 6 to 9 show a process of loading the carrier 5 on which the battery 6 is placed, onto the battery accommodating portion 4. FIG. 6 shows a state before loading is started, where the carrier 5 is located on the rear side of the vehicle body 1. The rear cover 18 is pivoted upward, and the rear side and upper side of the battery accommodating portion 4 are opened. As shown in FIG. 7, the carrier 5 is brought close to the battery accommodating portion 4, and the guide rods 57 of the carrier 5 are placed onto the assist rollers 45 of the battery accommodating portion 4. Also, the carrier 5 is moved in an inclined state so that the shoes 54 ride on the floor plate 43.

Figure 8:
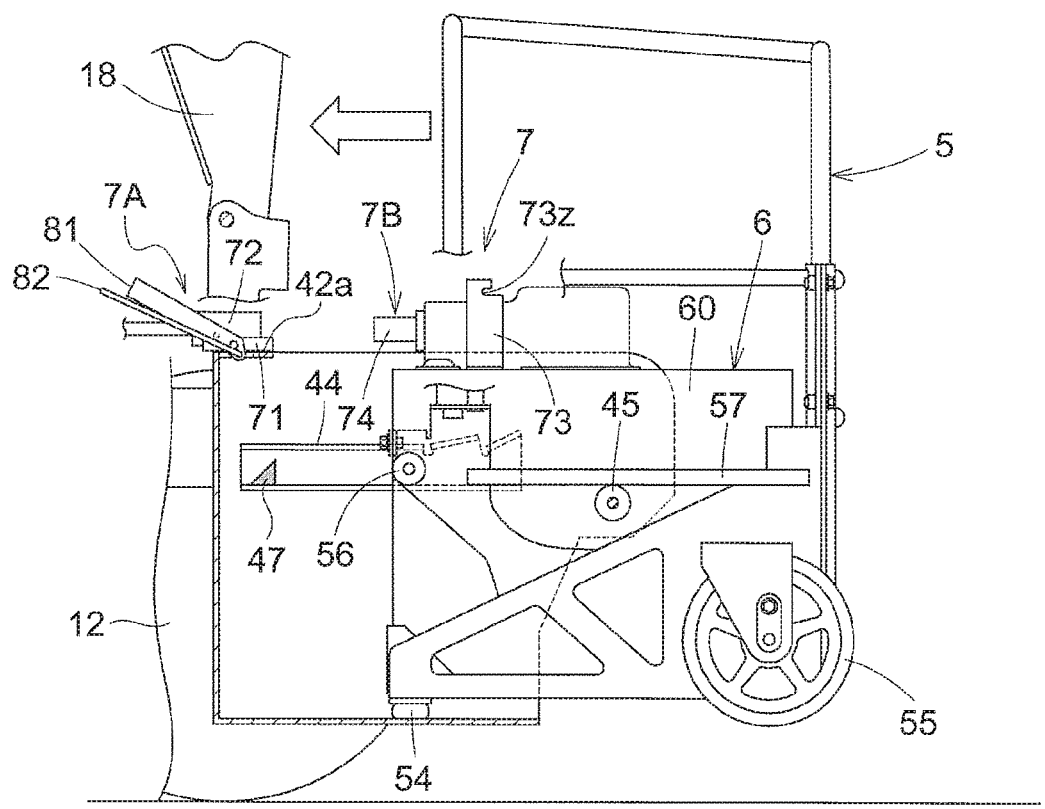

As shown in FIG. 8, the carrier 5 is moved forward while being restored to a horizontal orientation, and the guide rollers 56 of the carrier 5 are brought into the guide rails 44 of the battery accommodating portion 4. The carrier 5 can smoothly move in the horizontal orientation by being rollably supported by the guide rails 44 and the guide rollers 56, as well as the assist rollers 45 and the guide rods 57.

Figure 9:
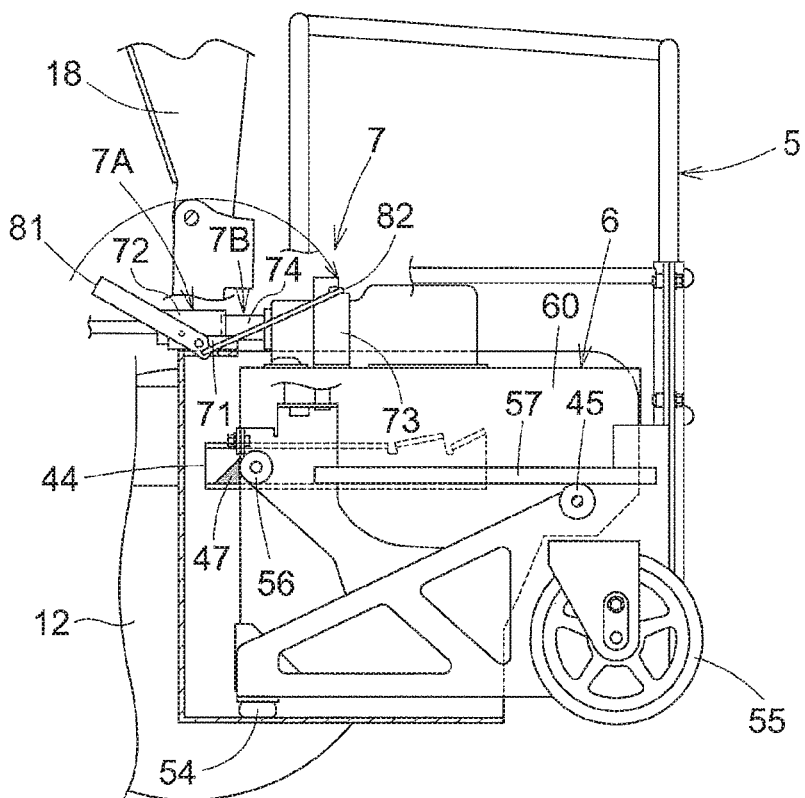
Figure 10:
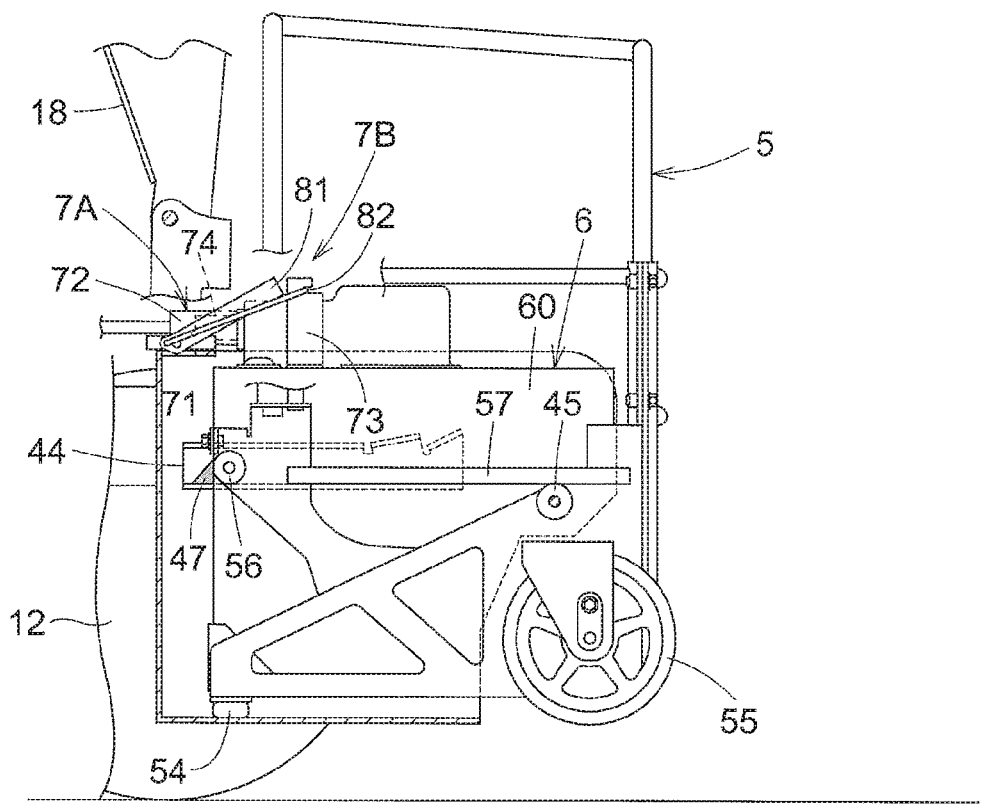

As shown in FIG. 9, further forward movement of the carrier 5 is inhibited by abutment of the guide rollers 56 against the stoppers 47. The stoppers 47 are positioned so that a pre-attachment orientation in which the first connector 72 and the second connector 74 oppose each other is realized at the positions of the carrier 5 and the battery accommodating portion 4 at the time when the guide rollers 56 abut against the stoppers 47. As shown in FIG. 10, the first connector 72 and the second connector 74 assume an attachment orientation in which the first and second connectors 72 and 74 are joined to each other, by bringing the first connector 72 and the second connector 74 closer to each other from the pre-attachment orientation. The operating tool 8 is used to switch from the pre-attachment orientation to the attachment orientation.

With reference to FIGS. 3, 11, 12 and 13, a configuration of the operating tool 8 next, as well as functions thereof.

The operating tool 8 includes the bracket 71 fixed to the vehicle body 1, the operating lever 81, and a connecting body 82. The bracket 71 has a channel shape, and a bottom face thereof is fixed to the horizontal face 42a of the front wall 42 of the battery accommodating portion 4. First holes 81a, through which a first lateral axis X1 extends, are provided in opposite side walls of the bracket 71. The operating lever 81 is a U-shaped member that is made by bending a plate material. The distance between opposite ends of the operating lever 81 substantially coincides with the lateral width of the bracket 71. The operating lever 81 is attached to the bracket 71 via pivot support pins so as to be able to pivot around the first lateral axis X1, and so as to surround the bracket 71. The connecting body 82 is a C-shaped member that is made by bending a rod material to have a cross-sectional shape such as that of a lip channel. Thus, the connecting body 82 has two vertical pieces 82a and a lateral piece 82b that is continuous with the vertical pieces 82a. Second holes 81b, through which a second lateral axis X2 extends, are provided in the operating lever 81, further on the lower end side relative to the first holes 81a. Opposite end portions of the vertical pieces 82a of the connecting body 82 are pivotably inserted into the second holes 81b, and the connecting body 82 is thus connected to the operating lever 81.

In this embodiment, the bracket 71 holds the first connector 72 so that the first connector 72 can slide in the front-rear direction. In addition, guide pins 81p extend in the lateral direction on inner faces of leg portions of the operating lever 81; and vertical groove holes 72h, into which the guide pins 81p are inserted, are provided in a housing of the first connector 72. Thus, the first connector 72 moves rearward upon the operating lever 81 being pivoted rearward.

FIG. 3 shows a first pivot position of the operating lever 81 and a home position of the connecting body 82. The operating lever 81 at the first pivot position and the connecting body 82 at the home position have been tilted forward.

Figure 11:
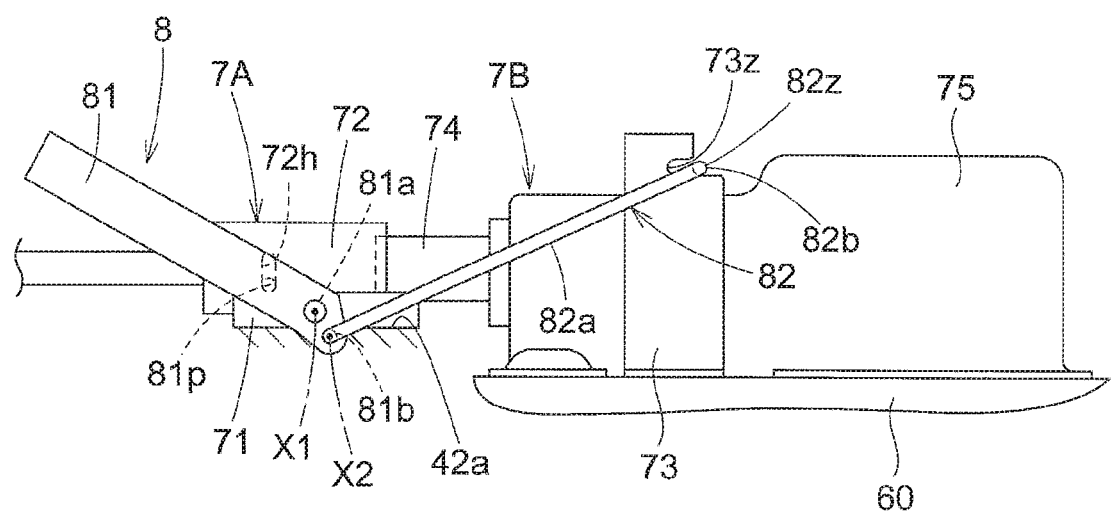
Figure 12:
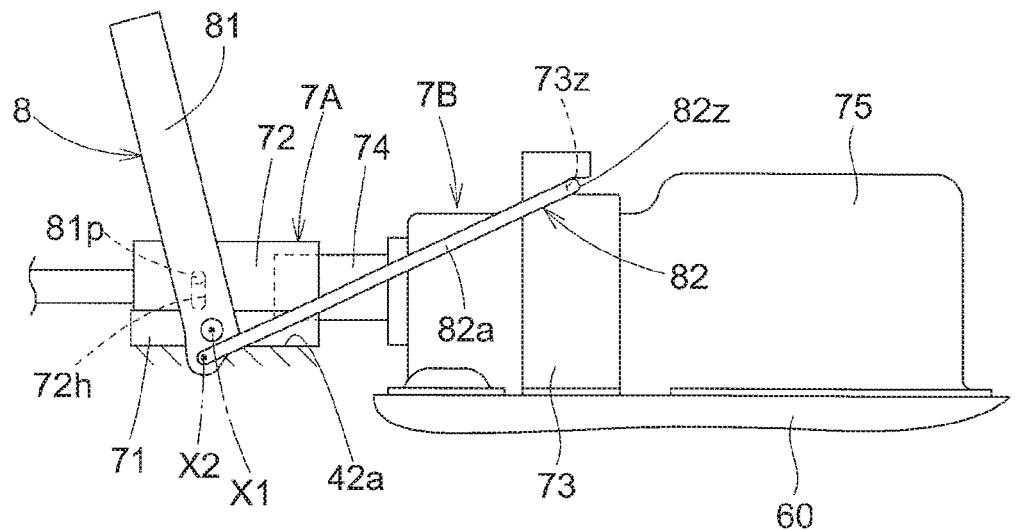
Figure 13:
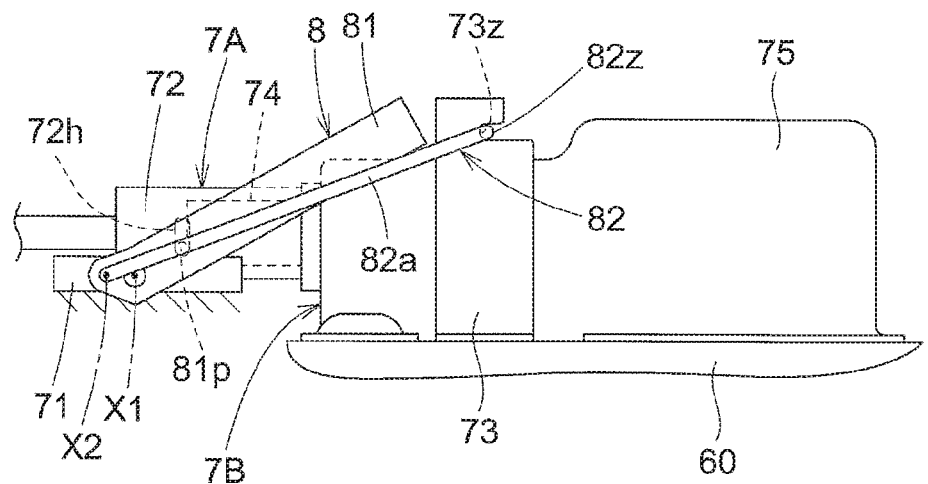

FIGS. 11, 12 and 13 illustrate switching from the pre-attachment orientation of the power supply coupler 7 in which the first connector 72 and the second connector 74 oppose each other, to the attachment orientation of the power supply coupler 7 in which the first connector 72 and the second connector 74 are joined to each other.

FIG. 11 illustrates the pre-attachment orientation. In the pre-attachment orientation, the second connector 74 has entered the housing of the first connector 72, but is not in a joined state. In the pre-attachment orientation, the connecting body 82 has pivoted rearward from the home position to a working position. The fixation bracket 73 attached to the case 60 of the battery 6 includes a gate-shaped member for holding the second connector 74 from both sides, and cutouts that extend forward from the rear side are formed near upper ends of both legs of the gate-shaped member. At the working position of the connecting body 82, the connecting body 82 and the fixation bracket 73 are connected to each other through the cutouts. At this time, the cutouts function as locked portions 73z that are to be locked with locking portions 82z of the connecting body 82. The locking portions 82z are formed at a free end of the connecting body 82. In the illustrated embodiment, the locking portions 82z are formed at portions of the lateral piece 82b of the connecting body 82 that are close to the vertical pieces 82a.

FIG. 12 illustrates an intermediate orientation between the pre-attachment orientation and the attachment orientation. The positional relationship between the second lateral axis X2 and the first lateral axis X1 is set so that the second lateral axis X2 is displaced forward of the first lateral axis X2 as a result of the operating lever 81 being pivoted rearward from the pre-attachment orientation. That is to say, the second lateral axis X2 moves in the direction in which the second connector 74 is attached. Accordingly, in the intermediate orientation, the locking portions 82z are firmly locked at the locked portions 73z, and also the second connector 74 moves forward together with the carrier 5. As a result of this forward movement of the second connector 74 and the aforementioned rearward movement of the first connector 72, the first connector 72 and the second connector 74 moves close to each other. At this time, the guide rollers 56 of the carrier 5 press the stoppers 47 to elastically displace the stoppers 47.

FIG. 13 illustrates the attachment orientation. The first connector 72 and the second connector 74 further move closer to each other through the switching to this attachment orientation, and eventually, the first connector 72 and the second connector 74 are joined to each other. Also, in this attachment orientation, the guide rollers 56 of the carrier 5 further press the stoppers 47, and the carrier 5 receives a rearward biasing force from the elastically displaced stoppers 47. The carrier 5 is firmly fixed to the battery accommodating portion 4 by the biasing force and the locking between the locking portions 82z of the connecting body 82 and the locked portions 73z.

Also, in the positional relationship between the second lateral axis X2 and the first lateral axis X1 in the attachment orientation, a pivoting force that pivots the operating lever 81 in the forward direction is generated by a tensile force generated on the second lateral axis X2 due to a tense state of the connecting body 82. That is to say, the connecting body 82, when in a state (attachment orientation) of being locked at the fixation bracket 73 (second connector 74), functions as a holding mechanism for holding the operating lever 81 at the second pivot position.

For switching from the attachment orientation to the pre-attachment orientation, the connecting body 82 and the fixation bracket 73 are unlocked, the connecting body 82 is pivoted forward, and thereafter, the operating lever 81 is restored to the first pivot position from the second pivot position. Thus, the first connector 72 moves forward, and the joint between the first connector 72 and the second connector 74 is canceled. Furthermore, the carrier 5 enters a free state, and thus can be moved out of the battery accommodating portion 4.

Note that the embodiment disclosed in the specification is an example, and embodiments of the present invention are not limited thereto. The present invention can be altered as appropriate without departing from the purpose thereof.

Variations of First Embodiment (1) In the foregoing embodiment, the first connector 72 also moves rearward as the operating lever 81 is pivoted from the first pivot position to the second pivot position, but this is not limitative. Instead thereof, the first connector 72 may be fixed on the vehicle body side.

(2) In the foregoing embodiment, the battery 6 is surrounded by the carrier 5, but this is not limitative. Instead thereof, the carrier 5 may be omitted, and the functions provided in part of the carrier 5, such as those of the guide rollers 56 and the large-diameter wheels 55, may be provided on part of the battery 6.

(3) In the foregoing embodiment, the operating lever 81 and the connecting body 82 are provided on the vehicle body (first connector) side, but this is not limitative. Instead thereof, the operating lever 81 and the connecting body 82 may be provided on the battery (second connector) side.

(4) The foregoing embodiment has described an electric mowing machine as an example of an electric work vehicle, but the present invention is not limited thereto. The present invention is applicable to all electric work vehicles in which a removable battery is mounted.

Second Embodiment

Figure 14:
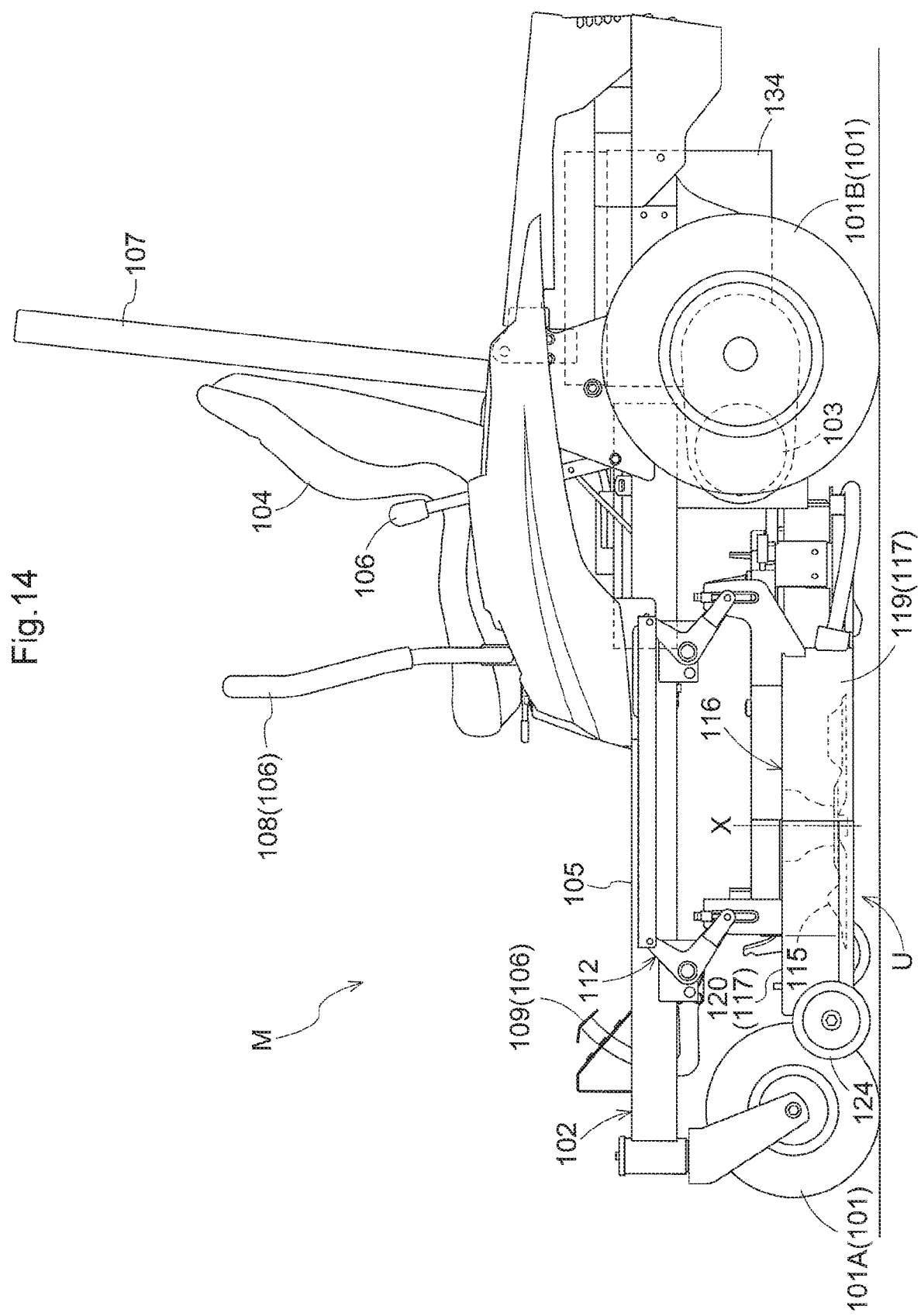
Figure 15:
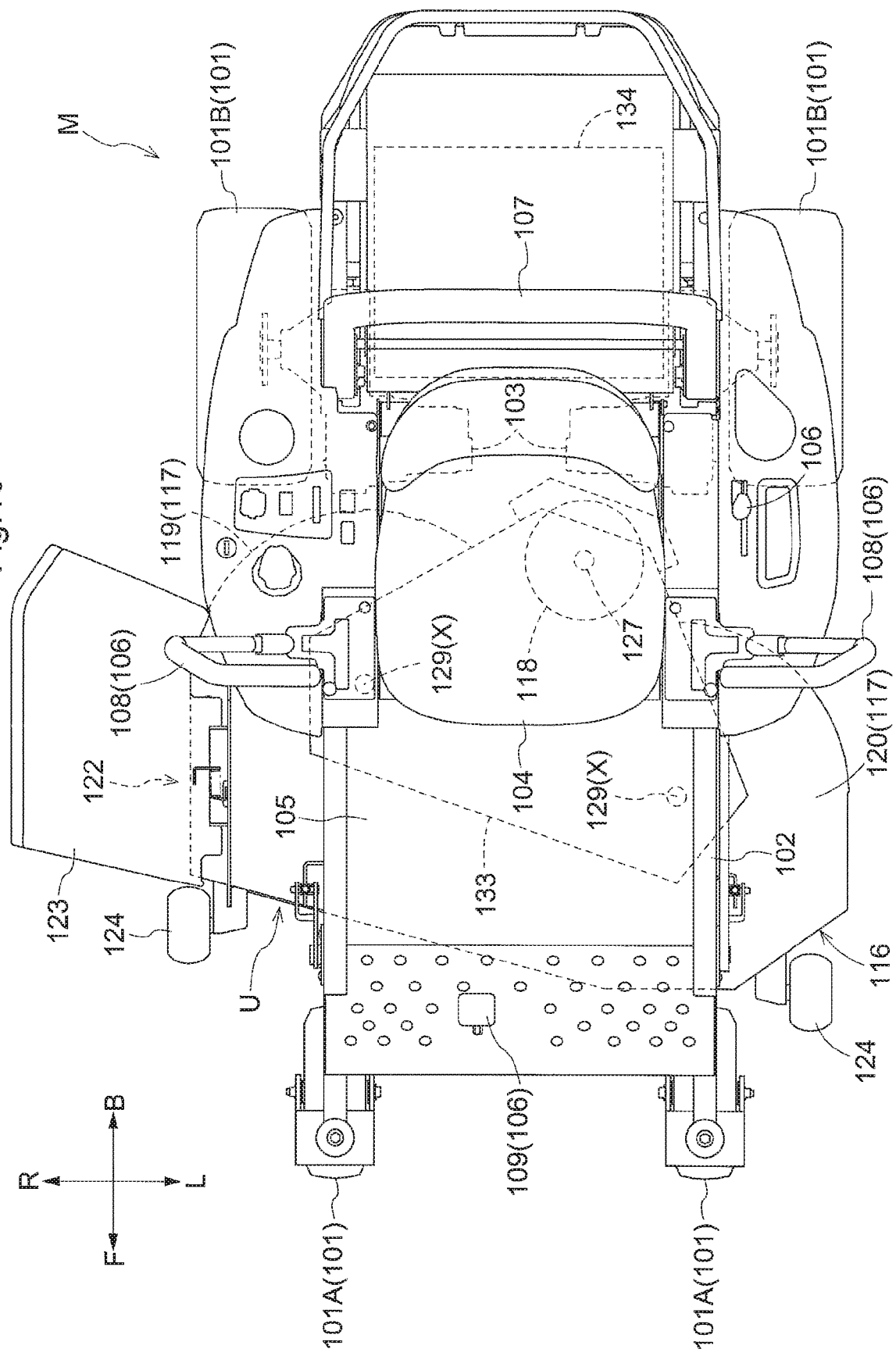
Figure 16:
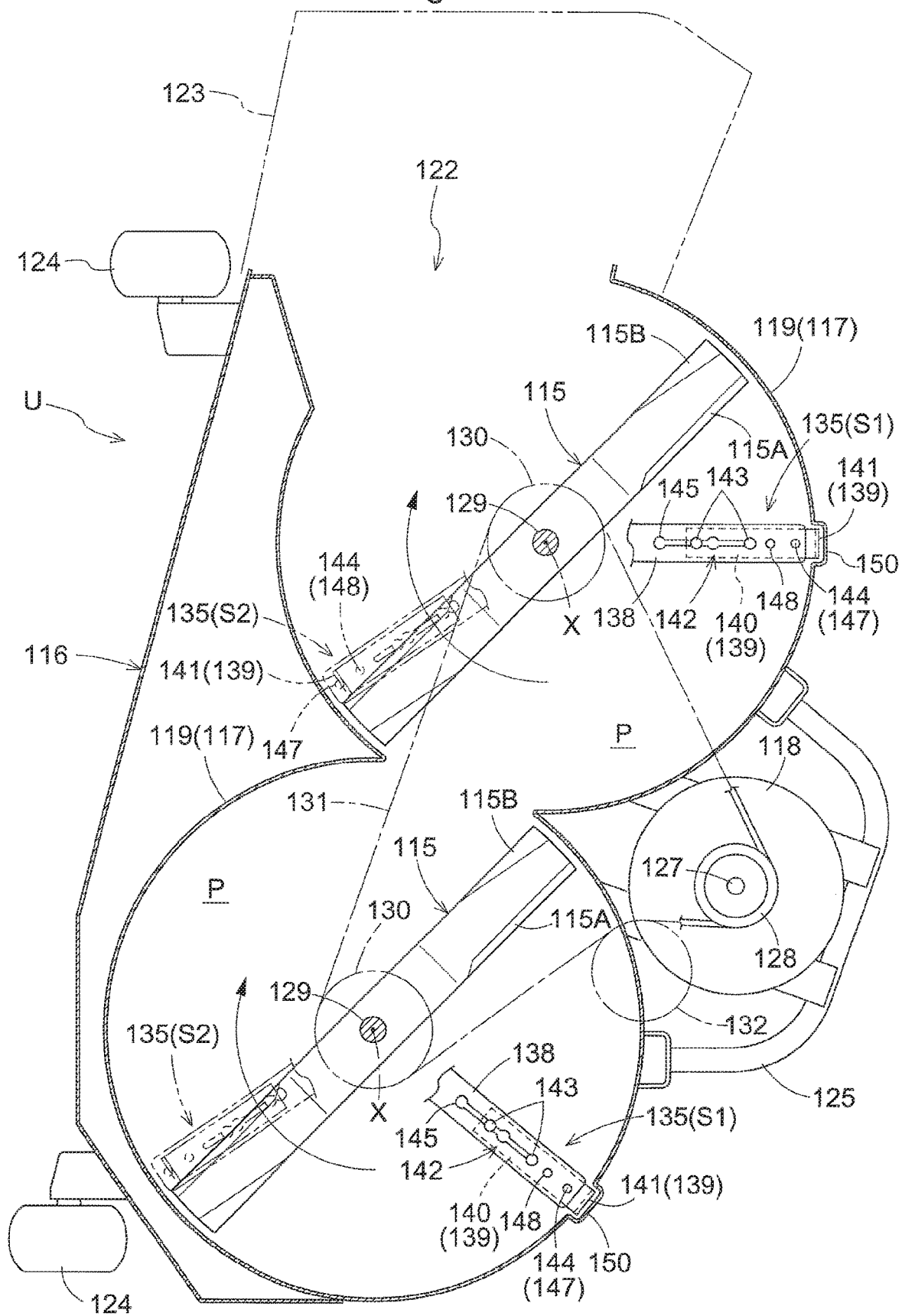

With reference to FIGS. 14 to 16, the second embodiment will be described next.

A mower unit U shown in FIGS. 14 to 16 and other figures is mounted in a vehicle body M of a boarding-type mowing machine. The boarding-type mowing machine can mow grass on the ground surface using the mower unit U while the vehicle body M is traveling. Note that "front" refers to the direction of the arrow F shown in FIG. 15, "rear" refers to the direction of the arrow B shown in FIG. 15, "left" refers to the direction of the arrow L shown in FIG. 15, and "right" refers to the direction of the arrow R shown in FIG. 15.

As shown in FIGS. 14 to 15, the vehicle body M is provided with a traveling apparatus 101, and a body frame 102 that is assembled to form a frame supported by the traveling apparatus 101. The traveling apparatus 101 is provided with a pair of right and left front wheels 101A that are constituted by caster wheels, and a pair of right and left rear wheels 101B that are constituted by driving wheels. The right and left rear wheels 101B can be independently driven by respective electrical travel motors 103.

As shown in FIGS. 14 and 15, the vehicle body M is provided with an operator seat 104 on which an operator can sit, a floor panel 105 at which the feet of the operator are positioned, an operation unit 106 that is operated by the operator, and a gate-shaped fall protection frame 107 that stands upright on the rear side of the operator seat 104.

As shown in FIGS. 14 and 15, the operation unit 106 is provided with right and left steering levers 108 that enable operations to change the rotational speed of the respective rear wheels 101B by changing the rotational speed of the right and left travel motors 103, and a lift pedal 109 that protrudes from the floor panel 105 and enables a braking operation for the traveling apparatus 101.

As shown in FIGS. 14 and 15, the mower unit U is arranged in a lower portion of the vehicle body M between the front wheels 101A and the rear wheels 101B, and the mower unit U is supported in a suspended manner in the lower portion of the vehicle body M so that the height of the mower unit U can be changed by a pair of front and rear lifting link mechanisms 112.

The lift pedal 109 is operably connected with the lifting link mechanisms 112. The operator can raise the mower unit U to a non-working position by performing an operation to press the lift pedal 109 with a foot. The operator can also lower the mower unit U to a working position by canceling the operation to pressing the lift pedal 109 with a foot.

Figure 17:
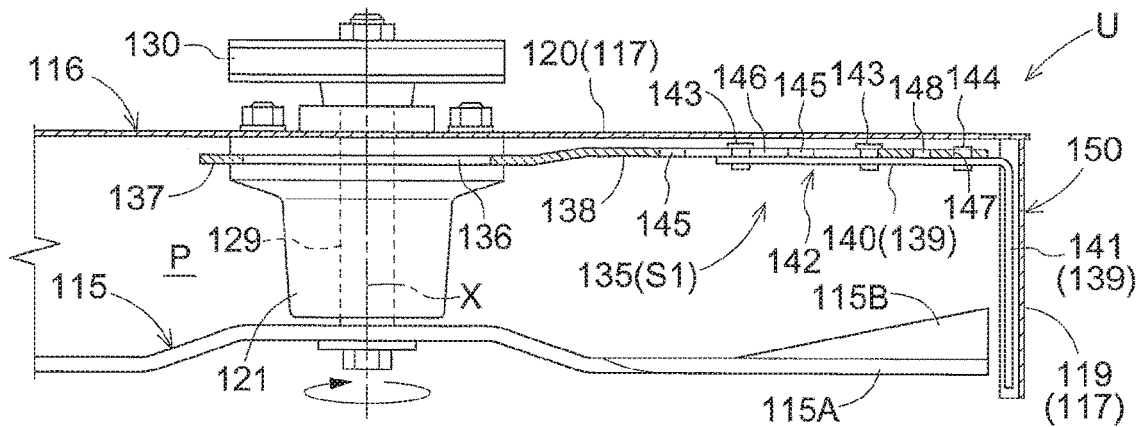
Figure 18:
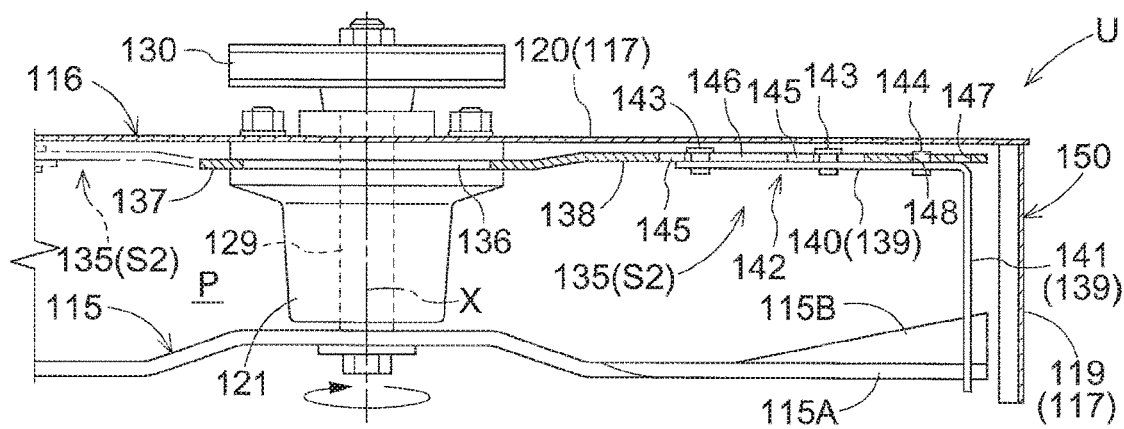

As shown in FIGS. 16 to 18, the mower unit U is provided with a plurality of (two in this embodiment) blades 115 capable of mowing grass on the ground surface by being driven to rotate around vertical rotation axes X, and a mower deck 116 that rotatably supports the blades 115. The mower deck 116 is provided with a housing 117 that covers the blades 115 and whose lower face is open. A motive power source of the blades 115 is a work motor 118 (which corresponds to an "electric motor").

As shown in FIGS. 15 to 18, the housing 117 is provided with a vertical wall portion 119 that has an arc shape simulating the outer shape of the rotation trajectories of the blades 115, a top plate portion 120 that covers the upper side of the vertical wall portion 119, etc. Each blade 115 is supported to be rotatablearound a rotation axis X, by a bearing member 121 that is fixed to the top plate portion 120 of the housing 117. The space surrounded by the vertical wall portion 119 and the top plate portion 120 of the housing 117 is an internal space P for accommodating the blades 115. A mown grass discharge port 122 for discharging grass mown by the blades 115 is open on one side, in the right-left direction, of the housing 117. A cylindrical discharge cover 123 is attached to the mown grass discharge port 122. The mower deck 116 is provided with a plurality of grounded wheels 124, which are caster wheels.

As shown in FIG. 16, the work motor 118 for driving the blades 115 is arranged at a center portion, in the right-left direction, of the mower deck 116. More specifically, the work motor 118 is arranged in a rear portion of the mower deck 116. The work motor 118 is supported by a support deck 125, which is provided in a rear portion of the vertical wall portion 119 of the mower deck 116.

As shown in FIG. 16 and other figures, the mower deck 116 is provided with a power transmission mechanism 126 for transmitting motive power from the work motor 118 to the blades 115. The power transmission mechanism 126 is provided with an output pulley 128 that integrally rotates with an output shaft 127 of the work motor 118, drive pulleys 130 that integrally rotate with rotary shafts 129 of the respective blades 115, a drive belt 131 that is wound around the output pulley 128 and the drive pulleys 130, and a tension pulley 132 that applies a tensile force to the drive belt 131 (see FIG. 16). Upon the work motor 118 being driven, rotational motive power is transmitted to the rotary shafts 129 of the blades 115 via the output pulley 128 and the drive pulleys 130. The power transmission mechanism 126 is covered by a drive unit cover 133.

As shown in FIGS. 16 to 18, each blade 115 is provided with blade portions 115A that are located on the downstream side in the rotational direction when the rotary shaft 129 is rotated forward, and wind-generating vanes 115B that stand upright and are located on the upstream side in the rotational direction when the rotary shaft 129 is rotated forward. The blade portion 115A and the wind-generating vane 115B are provided on each of opposite portions of each blade 115 across the rotary shaft 129. Note that, in this embodiment, the direction of forward rotation of the blades 115 is a clockwise direction as seen from above as indicated by arrows in FIG. 16.

As shown in FIGS. 14 and 15, the vehicle body M is provided with a battery 134, which serves as a power source.

The travel motors 103 and the work motor 118 are driven by electrical power of the battery 134.

Each of the travel motors 103 can adjust its output therefrom so that the respective rear wheels 101B rotate at different rotational speeds. Thus, the vehicle body M can be turned around.

Figure 20:
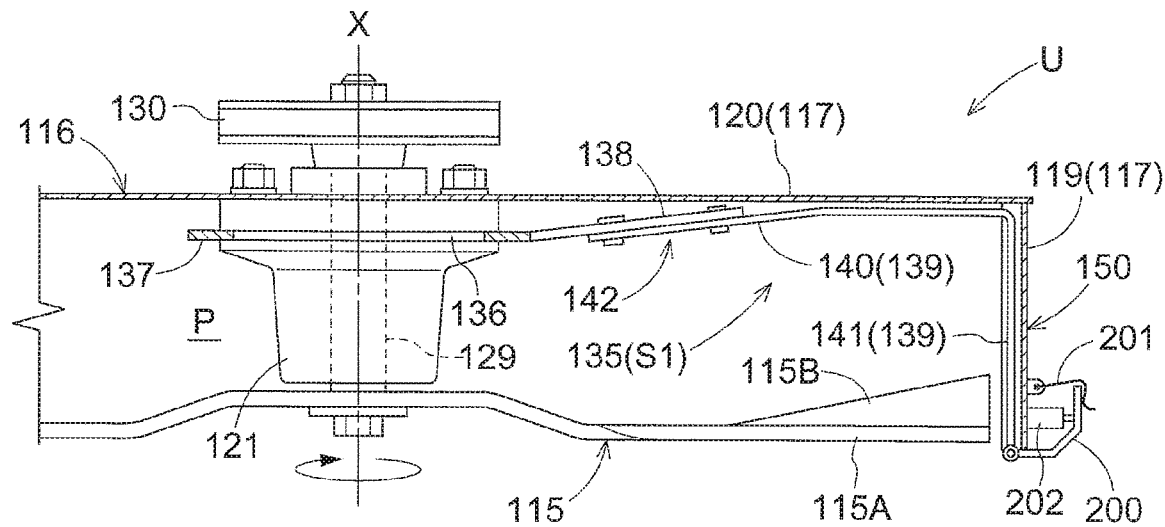

The work motor 118 shown in FIGS. 15, 16 and 20 can freely change the rotational speed of the blades 115. The work motor 118 can also switch the rotational direction of the blades 115 between a forward rotational direction and a reverse rotational direction.

Cleaning Mechanism

As shown in FIGS. 16 to 19, the mower unit U is provided with cleaning mechanisms 135, which can remove foreign matter that is present in the internal space P of the housing 117 by being driven to rotate around the rotation axes X. The cleaning mechanisms 135 are located below the top plate portion 120 of the housing 117, inward of the vertical wall portion 119. The cleaning mechanisms 135 are favorably made of a metal such as iron.

As shown in FIGS. 16 and 17, each cleaning mechanism 135 can be switched between a withdrawal state S1 (see FIGS. 16 and 17) in which the cleaning mechanism 135 is not located on the rotation trajectory of the corresponding blade 115, and a use state S2 (see FIGS. 16 and 18) in which the cleaning mechanism 135 is located on or interferes with the rotation trajectory of the corresponding blade 115 and rotates together with the blade 115.

Figure 19:
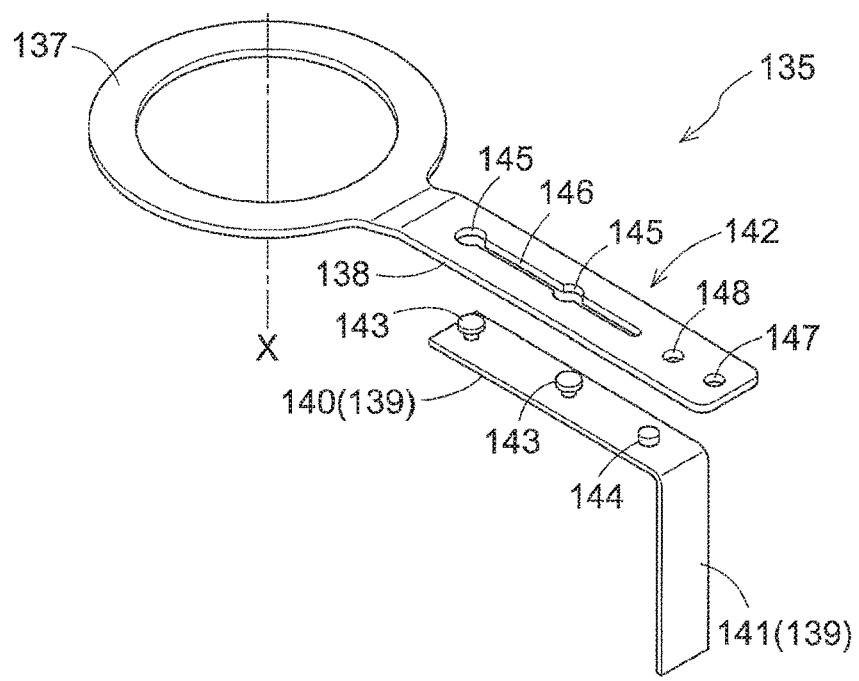

As shown in FIGS. 17 to 19 and other figures, each cleaning mechanism 135 includes an annular support portion 137 that is provided on a circumferential groove 136 in the bearing member 121 and is rotatably supported with the corresponding rotation axis X serving as the center, a plate-shaped extending portion 138 that extends from the support portion 137 outward in the radial direction with the rotation axis X serving as the center, and a bent plate portion 139 that is bent to form an L shape and is attached to the extending portion 138. A portion between the support portion 137 and the extending portion 138 is bent, so that an area of the extending portion 138 to which the bent plate portion 139 is attached is closer to the top plate portion 120 than the support portion 137.

The bent plate portion 139 includes a lateral plate portion 140 that extends in the radial direction with the rotation axis X serving as the center, and a vertical plate portion 141 that extends downward from an outer end portion, in the radial direction, of the lateral plate portion 140.

Also, as shown in FIGS. 16 to 19 and other figures, each cleaning mechanism 135 is provided with a sliding portion 142 capable of sliding in the radial direction with the rotation axis X serving as the center. The cleaning mechanism 135 can be switched between the withdrawal state S1 and the use state S2 by sliding the sliding portion 142.

The sliding portion 142 can switch the cleaning mechanism 135 between the withdrawal state S1 and the use state S2 by relatively sliding the lateral plate portion 140 of the bent plate portion 139 with respect to the extending portion 138.

Specifically, as shown in FIGS. 16 to 19 and other figures, the sliding portion 142 has two headed pins 143 and one engaging pin 144, which are provided on the lateral plate portion 140 side of the bent plate portion 139. The sliding portion 142 also has, on the extending portion 138 side, a groove portion 146 in which two large-diameter insertion holes 145 are arranged next to each other in the radial direction with the rotation axis X serving as the center, the groove portion 146 extending in the radial direction, and a first engaging hole 147 and a second engaging hole 148 that can engage with the engaging pin 144, and are arranged next to each other in the radial direction with the rotation axis X serving as the center.

The bent plate portion 139 shown in FIGS. 16 to 19 and other figures is flexible, and can be bent and deformed like a flat spring. First, the lateral plate portion 140 of the bent plate portion 139 is slightly bent, the two headed pins 143 are passed through the two insertion holes 145 while avoiding the engaging pin 144 from being caught at the extending portion 138, and shaft portions of the two headed pins 143 are passed through the groove portion 146. Then, if the two headed pins 143 are slid through the groove portion 146, and the engaging pin 144 is engaged with the first engaging hole 147 located on the outer side in the radial direction, the cleaning mechanism 135 enters the withdrawal state S1. On the other hand, the cleaning mechanism 135 enters the use state S2 if the two headed pins 143 is slid through the groove portion 146, and the engaging pin 144 is engaged with the second engaging hole 148 located on the inner side in the radial direction. That is to say, the sliding portion 142 is a detent mechanism that is positioned at two positions, namely a position corresponding to the withdrawal state S1 and a position corresponding to the use state S2.

As shown in FIGS. 16 to 18, the vertical wall portion 119, which is a part of the housing 117, is provided with protruding portions 150 for the respective blades 115, each of the protruding portions 150 protruding outward in the radial direction with a corresponding rotation axis X serving as the center, and allowing the vertical plate portion 141 of the bent plate portion 139, which is a part of a corresponding cleaning mechanism 135, to enter the protruding portion 150 to cause the cleaning mechanism 135 to enter the withdrawal state S1.

As shown in FIGS. 16 to 18, each protruding portion 150 has a groove shape extending in the vertical direction. The protruding portion 150 accommodates the vertical plate portion 141 of the bent plate portion 139 of the corresponding cleaning mechanism 135 in the withdrawal state S1. The vertical plate portion 141 of the bent plate portion 139 does not move out of the protruding portion 150 due to the vertical plate portion 141 abutting against a wall portion of the protruding portion 150.

As shown in FIG. 18 and other figures, if the blade 115 is driven to rotate in the forward rotational direction with the mower unit U positioned at the non-working position, and with the cleaning mechanism 135 set in the use state S2, a face of the bent plate portion 139 on the upstream side in the rotational direction is pressed by the blade portion 115A of the blade 115, the entire cleaning mechanism 135 is driven to rotate around the rotation axis X with the blade 115 serving as a driving source, and faces of the extending portion 138 and the bent plate portions 139 on the downstream side in the rotational direction function as a scraper. Thus, foreign matter sticking to the inner face of the top plate portion 120 of the housing 117 and foreign matter sticking to the inner face of the vertical wall portion 119 of the housing 117 can be scraped and favorably removed with the cleaning mechanism 135.

Third Embodiment

Next, the third embodiment will be described. Note that the configurations in the third embodiment that are the same as those in the second embodiment are assigned the same signs, and descriptions thereof are omitted.

Figure 21:
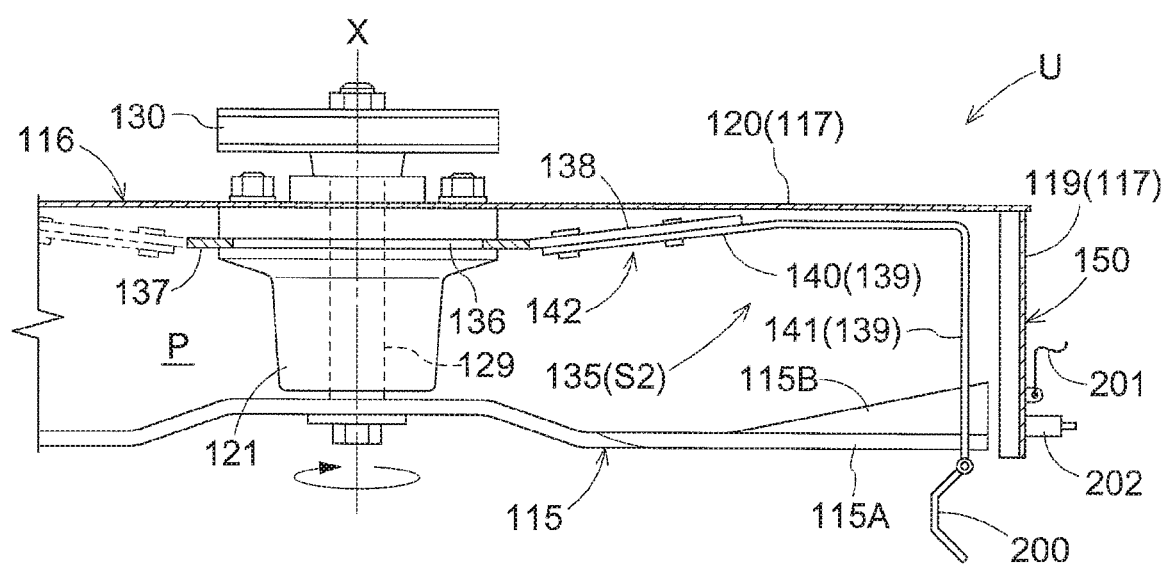

As shown in FIGS. 20 and 21, the mower unit U is provided with an exposed portion 200, which is pivotably attached to the bent plate portion 139 of each cleaning mechanism 135. Also, in the mower unit U, the vertical wall portion 119 is provided with a lock portion 201 capable of locking the cleaning mechanism 135 in the withdrawal state S1. The mower unit U is also provided with a detection sensor 202, which is located on the outer side of the protruding portion 150 and is capable of detecting whether the cleaning mechanism 135 is in the withdrawal state S1 or the use state S2.

As shown in FIG. 21 and other figures, the exposed portion 200 is exposed downward of the housing 117 when the cleaning mechanism 135 is in the use state S2. The lock portion 201 can lock the cleaning mechanism 135 in the withdrawal state S1 by engaging with the exposed portion 200.

As shown in FIG. 20 and other figures, the cleaning mechanism 135 is locked in the withdrawal state S1 by setting the cleaning mechanism 135 in the withdrawal state S1, and engaging the exposed portion 200 with the lock portion 201, which is a pivoting piece that is pivotably attached to the outer side of the housing 117. Furthermore, as a result of the cleaning mechanism 135 being locked in the withdrawal state S1, the exposed portion 200 comes into contact with the detection sensor 202, and the detection sensor 202 detects the withdrawal state S1 of the cleaning mechanism 135.

As shown in FIG. 21 and other figures, to set the cleaning mechanism 135 in the use state S2, the exposed portion 200 is disengaged from the lock portion 201. Thus, the exposed portion 200 enters a state of being exposed downward of the housing 117. In this state, the exposed portion 200 no longer comes into contact with the detection sensor 202, and the detection sensor 202 detects the use state S2 of the cleaning mechanism 135 (i.e. a state where the cleaning mechanism 135 is not in the withdrawal state S1).

Also, the sliding portion 142 of the cleaning mechanism 135 can be slid in an inclined direction so as to approach the top plate portion 120 further on the outer side in the radial direction with the rotation axis X serving as the center. Specifically, the extending portion 138 and the lateral plate portion 140 are inclined so as to be closer to the top plate portion 120 on the outer side in the radial direction with the rotation axis X serving as the center. As a result, when the cleaning mechanism 135 is set in the withdrawal state S1, the bent plate portion 139 is located in an area almost reaching the inner face of the top plate portion 120, and thus the cleaning mechanism 135 can be withdrawn while being separated from the blade 115 as much as possible.

Mowing Operation Mode and Cleaning Mode

The mower unit U can be switched between a mowing operation mode of performing a mowing operation and a cleaning mode. In the mowing operation mode, if the detection sensor 202 detects the withdrawal state S1 of the cleaning mechanism 135, the work motor 118 is driven to rotate the blades 115 forwardly at a normal rotational speed. On the other hand, in the mowing operation mode, if the detection sensor 202 detects the use state S2 of the cleaning mechanism 135, the work motor 118 is prohibited from being driven, and the blades 115 are not driven to rotate.

In the cleaning mode, if the detection sensor 202 detects the withdrawal state S1 of the cleaning mechanism 135, the blades 115 are not rotated, and the cleaning mechanisms 135 are not driven to rotate. On the other hand, in the cleaning mode, if the detection sensor 202 detects the use state S2 of the cleaning mechanism 135, the work motor 118 is controlled to rotate the blades 115 forwardly at a speed lower than the speed in the mowing operation mode. That is to say, when the detection sensor 202 detects the use state S2 (i.e. in the cleaning mode), the work motor 118 is controlled so that the driving speed thereof is lower than that when the detection sensor 202 detects the withdrawal state S1 (i.e. in the mowing operation mode). As a result, the cleaning mechanism 135 is driven to rotate at a relatively low rotational speed, and foreign matter that is present in the internal space P of the housing 117 is scraped and removed appropriately.

In both the mowing operation mode and the cleaning mode, the current value of the work motor 118 is monitored so that the work motor 118 is not overloaded. If the current value that overloads the work motor 118 is detected, the work motor 118 is stopped.

Variations of Second and Third Embodiments

Other variations achieved by modifying the foregoing embodiments will be described below. A plurality of the other variations can be combined and applied to the foregoing embodiments unless inconsistency occurs. Note that the scope of the present invention is not limited to the content disclosed in the embodiments.

(1) In the third embodiment, for example, a display unit for displaying various kinds of information for an operator may be provided near the operator seat 104. In this case, information regarding a mode such as indicating the mowing operation mode or the cleaning mode can be displayed on the display unit. In the case of the mowing operation mode, if the detection sensor 202 does not detect the withdrawal state S1 of the cleaning mechanism 135, the display unit may notify the operator of information indicating that the blades 115 are not to be driven to rotate.

(2) The foregoing embodiments have described an example in which the sliding portion 142 is positioned at two positions, namely the position corresponding to the withdrawal state S1 and the position corresponding to the use state S2. However, the present invention is not limited thereto. For example, the sliding portion 142 may be able to be positioned in an area other than the aforementioned two positions that are the position corresponding to the withdrawal state S1 and the position corresponding to the use state S2.

(3) The foregoing embodiments have described an example in which the sliding portion is provided to switch the cleaning mechanisms 135 between the withdrawal state S1 and the use state S2. However, another structure may be employed. For example, a folding portion may be provided in place of the sliding portion, and the cleaning mechanisms 135 may be switched between the withdrawal state S1 and the use state S2 by switching the folding portion between a folded state and an expanded state.

(4) The foregoing embodiments have described an example in which the housing 117 includes the protruding portions 150 for withdrawing the cleaning mechanisms 135 in the withdrawal state S1. For example, the housing 117 may be provided with another structure, such as cutout portions, for withdrawing the cleaning mechanisms 135 in the withdrawal state S1, in place of the protruding portions 150.

(5) The foregoing embodiments have described an example in which the detection sensor 202 capable of detecting that the cleaning mechanisms 135 are in the withdrawal state S1 is provided. However, the present invention is not limited thereto, and the detection sensor 202 may not be provided.

(6) The foregoing embodiments have described an example in which each cleaning mechanism 135 includes the bent plate portion 139 and functions as a scraper. However, the present invention is not limited thereto. For example, a blush portion that includes a blush with a lot of hair with which foreign matter can be blushed off may be provided in place of the bent plate portion 139.

(7) The foregoing embodiments have described an example in which, when the inner face of the housing 117 is cleaned, the blades 115 are rotated forwardly, similarly to when the mowing operation is performed. However, the present invention is not limited thereto. For example, the blades 115 may be rotated reversely when the inner face of the housing 117 is cleaned. Thus, the cleaning mechanisms 135 are driven to rotate while being pressed on the wind-generating vane 115B side, rather than on the blade portion 115A side, of the blades 115. Accordingly, favorable durability of the cleaning mechanism 135 is achieved.

(8) The foregoing embodiments have described an example in which the motive power source of the blades 115 is the work motor 118. However, the present invention is not limited thereto. For example, the motive power source of the blades 115 may be an engine. In this case, in the above-described third embodiment, the detection result from the detection sensor 202 may be used to restrict the rotational speed of the engine. That is to say, a configuration may be employed in which, for example, the restriction of the rotational speed of the engine may be canceled when the withdrawal state S1 of the cleaning mechanisms 135 is detected by the detection sensor 202, and meanwhile, the rotational speed of the engine is restricted to be less than a restriction rotational speed so as not to be too high, when the use state S2 of the cleaning mechanisms 135 is detected by the detection sensor 202.

What is claimed is:

1. An electric work vehicle comprising:
    a vehicle body;
    a battery accommodating portion that is provided in the vehicle body and accommodates a battery;
    a first connector provided on the battery accommodating portion;
    a second connector provided on the battery; and
    an operating tool for moving the battery and the second connector, and switching from a pre-attachment orientation in which the second connector opposes the first connector to an attachment orientation in which the second connector is joined to the first connector,
    wherein at least a portion of the first connector is connected to the operating tool.

2. The electric work vehicle according to claim 1, further comprising:
    a stopper for inhibiting movement of the battery beyond the attachment orientation, wherein the battery is fixed to the battery accommodating portion by the stopper inhibiting the movement, and the operating tool biasing the battery toward the attachment orientation from the pre-attachment orientation.

3. An electric work vehicle comprising:
    a vehicle body;
    a battery accommodating portion that is provided in the vehicle body and accommodates a battery;
    a first connector provided on the battery accommodating portion;
    a second connector provided on the battery; and
    an operating tool for moving the battery and the second connector, and switching from a pre-attachment orientation in which the second connector opposes the first connector to an attachment orientation in which the second connector is joined to the first connector, wherein the operating tool includes:
   a bracket fixed to the vehicle body;
   an operating lever that is pivotal between a first pivot position and a second pivot position around a first lateral axis extending through the bracket; and
   a connecting body connected to the operating lever and pivotal around a second lateral axis extending through the operating lever, a locking portion being formed at a free end of the connecting body, and the locking portion being configured to be locked at a locked portion that is formed on the battery when the operating tool assumes the pre-attachment orientation, wherein in response to pivotal movement of the operating lever from the first pivot position to the second pivot position in a locked state where the locking portion is locked at the locked portion, the second lateral axis moves toward the first connector, and the first connector and the second connector are joined to each other, and wherein:
the first connector is configured to be moved relative to the vehicle body, and
the first connector is connected to the operating lever such that the first connector moves toward the second connector in response to the pivotal movement of the operating lever from the first pivot position to the second pivot position.

4. The electric work vehicle according to claim 3, wherein in the locked state, the connecting body functions as a holding mechanism for holding the operating lever at the second pivot position.

5. An electric work vehicle comprising:
a vehicle body;
a battery accommodating portion that is provided in the vehicle body and accommodates a battery;
a first connector provided on the battery accommodating portion;
a second connector provided on the battery; and
an operating tool for moving the battery and the second connector, and switching from a pre-attachment orientation in which the second connector opposes the first connector to an attachment orientation in which the second connector is joined to the first connector, wherein the operating tool includes:
   a bracket fixed to the vehicle body;
   an operating lever that is pivotal between a first pivot position and a second pivot position around a first lateral axis extending through the bracket; and
   a connecting body connected to the operating lever and pivotal around a second lateral axis extending through the operating lever, a locking portion being formed at a free end of the connecting body, and the locking portion being configured to be locked at a locked portion that is formed on the battery when the operating tool assumes the pre-attachment orientation, wherein in response to pivotal movement of the operating lever from the first pivot position to the second pivot position in a locked state where the locking portion is locked at the locked portion, the second lateral axis moves toward the first connector, and the first connector and the second connector are joined to each other, and wherein:
the connecting body has two vertical pieces and a lateral piece located between the vertical pieces,
the locking portion is formed at each of opposite ends of the lateral piece, and
the locked portion is located on each of opposite sides of the second connector to be locked with the locking portion associated therewith.

6. An electric work vehicle comprising:
a vehicle body;
a battery accommodating portion that is provided in the vehicle body and accommodates a battery;
a first connector provided on the battery accommodating portion;
a second connector provided on the battery;
an operating tool for moving the battery and the second connector, and switching from a pre-attachment orientation in which the second connector opposes the first connector to an attachment orientation in which the second connector is joined to the first connector;
a carrier for accommodating the battery; and
a guiding mechanism for guiding the carrier toward the battery accommodating portion from outside of the vehicle body, the guiding mechanism including guide rails attached to both side faces of the battery accommodating portion, and guide rollers attached to opposite side faces of the carrier and guided by the guide rails.

* * * * *